United States Patent
Chaugule et al.

(10) Patent No.: US 11,903,090 B2
(45) Date of Patent: *Feb. 13, 2024

(54) CLOUD-BASED CELLULAR SERVICE MANAGEMENT FOR MOBILE WIRELESS DEVICES

(71) Applicant: Apple Inc., Cupertino, CA (US)

(72) Inventors: Raj S. Chaugule, Santa Clara, CA (US); Can Xiong, San Jose, CA (US); Li Li, Los Altos, CA (US); Zexing Shi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,079

(22) Filed: Sep. 23, 2022

(65) Prior Publication Data

US 2023/0098263 A1  Mar. 30, 2023

Related U.S. Application Data

(63) Continuation of application No. 17/352,201, filed on Jun. 18, 2021, now Pat. No. 11,533,607.

(60) Provisional application No. 63/057,228, filed on Jul. 27, 2020, provisional application No. 63/041,712, filed on Jun. 19, 2020.

(51) Int. Cl.
*H04W 8/20* (2009.01)
*H04W 60/04* (2009.01)
*H04W 48/12* (2009.01)
*H04W 88/18* (2009.01)
*H04W 88/02* (2009.01)

(52) U.S. Cl.
CPC .......... *H04W 8/205* (2013.01); *H04W 48/12* (2013.01); *H04W 60/04* (2013.01); *H04W 88/02* (2013.01); *H04W 88/18* (2013.01)

(58) Field of Classification Search
CPC ..... H04W 8/205; H04W 48/12; H04W 60/04; H04W 88/02; H04W 88/18
USPC ....... 455/414.1, 410, 418, 424, 412.1, 422.1
See application file for complete search history.

(56) References Cited

U.S. PATENT DOCUMENTS

| | | | |
|---|---|---|---|
| 8,745,213 B2 | 6/2014 | Dare et al. | |
| 11,533,607 B2 * | 12/2022 | Chaugule | H04W 8/205 |
| 2015/0195827 A1 | 7/2015 | Feng et al. | |
| 2019/0311430 A1 | 10/2019 | Raleigh | |
| 2020/0128390 A1 | 4/2020 | Lee et al. | |
| 2021/0400466 A1 | 12/2021 | Chaugule et al. | |

* cited by examiner

*Primary Examiner* — Nghi H Ly
(74) *Attorney, Agent, or Firm* — DICKINSON WRIGHT RLLP

(57) ABSTRACT

This Application sets forth techniques for cloud-based cellular service management for a set of associated mobile wireless devices, including maintenance of information for one or more subscriber identity modules (SIMs) and/or electronic SIMs (eSIMs) used by the set of mobile wireless devices.

20 Claims, 19 Drawing Sheets

330

DEVICE CELLULAR SERVICE PROFILE TABLE STRUCTURE

```
Data {
    Device_Information,
    Array (Cellular_Profile_Information)
}

Device_Information {
    Device_ID_For_Communication,
    Device_Type,
    Display_Name,
    IMEIs,
    OS_Version,
    EUICC_Identifier
}

Cellular_Service_Profile_Information {
    ICCID,
    Phone_Number,
    MNO_Name,
    Label,
    MCC, MNC, GID1, GID2,
    Is_Physical_SIM_Card,
    Is_Profile_Active,
    iPhone_eSIM_Transfer_Feature_Information
} iPhone_eSIM_Transfer_Feature_Information {
    IS_Feature_Supported => {Supported, Ineligible, NoCarrierSupport, InProgress}
    Type_Of_Transfer => {Web-Sheet, OneClick}
    Transfer_Token
}
```

BLACKLIST TABLE ENTRY STRUCTURE

```
Data {
   Blacklist_ICCID,
   Blacklist_EID,
   Blacklist_IMEI,
   Uploader_EID,
   Uploader_IMEI
}
```

*FIG. 5A*

CLOUD-BASED CELLULAR SERVICE MANAGEMENT FOR MOBILE WIRELESS DEVICES

CROSS-REFERENCE TO RELATED APPLICATIONS

The present application is a continuation of U.S. application Ser. No. 17/352,201, filed Jun. 18, 2021, entitled "CLOUD-BASED CELLULAR SERVICE MANAGEMENT FOR MOBILE WIRELESS DEVICES," set to issue Dec. 20, 2022 as U.S. Pat. No. 11,533,607, which claims the benefit of U.S. Provisional Application No. 63/041,712, entitled "CLOUD-BASED CELLULAR SERVICE MANAGEMENT FOR MOBILE WIRELESS DEVICES," filed Jun. 19, 2020, and U.S. Provisional Application No. 63/057,228, entitled "CLOUD-BASED CELLULAR SERVICE MANAGEMENT FOR MOBILE WIRELESS DEVICES," filed Jul. 27, 2020, the contents of all of which are incorporated by reference herein in their entirety for all purposes.

FIELD

The described embodiments set forth techniques for cloud-based cellular service management for a set of associated mobile wireless devices, including maintenance of information for one or more subscriber identity modules (SIMs) and/or electronic SIMs (eSIMs) used by the set of mobile wireless devices.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Cellular capability continues to be added to a broad variety of wireless devices. A set of mobile wireless devices can be associated with a common user account managed via a cloud-based network service. A user of the set of mobile wireless devices can seek to manage cellular service profiles via communication with servers of the cloud-based network service.

SUMMARY

This Application sets forth techniques for cloud-based cellular service management for a set of associated mobile wireless devices, including maintenance of information for one or more subscriber identity modules (SIMs) and/or electronic SIMs (eSIMs) used by the set of associated mobile wireless devices. Each mobile wireless device in the set of associated mobile wireless devices can be associated with a common user account (or with a set of associated user accounts) managed by a cloud-based service, e.g., using an iCloud® account that is network accessible to the mobile wireless devices via cloud-based network servers. Each mobile wireless device can upload an encrypted version of a device cellular service profile table that encapsulates device information and cellular service profile information for the mobile wireless device to the cloud-based network servers. The device information can include a list of device-specific identifiers for the mobile wireless device, while the cellular service profile information can include an array of identifiers and features for cellular service profiles, including both SIMs and/or eSIMs, on the mobile wireless device. The encrypted device cellular service profile tables stored by the cloud-based servers can be accessible to any mobile wireless device of the set of associated mobile wireless devices for management of cellular service profiles used by the mobile wireless device. The device and cellular service profile information can be used to determine available cellular service profiles to transfer from one mobile wireless device to another mobile wireless device of the set of associated mobile wireless devices. The device and cellular service profile information can also be used i) to share cellular service profile features among the set of mobile wireless devices, such as family sharing of a cellular service profile's voice features and/or data features, and ii) to synchronize applicable cellular service usage, transaction history, and cellular service profile user-configured preferences among the set of associated mobile wireless devices. The device cellular service profile tables can be end-to-end encrypted, and therefore, the device and cellular service profile information contained in the encrypted device cellular service profile tables can be accessed only via decryption by a mobile wireless device, which can be required to be signed into the associated user account of the cloud-based service, including in some embodiments multiple-factor authentication to ensure data protection and privacy. In some embodiments, a blacklist table that lists combinations of cellular service profiles and mobile wireless devices can be also maintained by the cloud-based service to use for filtering cellular service profile lists to improve accurate presentation of cellular service profiles that can be transferred between mobile wireless devices in the set of associated mobile wireless devices.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 3C illustrates an exemplary device cellular service profile table structure for managing device information and cellular service profile information for a mobile wireless device, according to some embodiments.

FIG. 5A illustrates an exemplary structure for a blacklist table entry for device information and cellular service profile information for a set of mobile wireless devices, according to some embodiments.

DETAILED DESCRIPTION

Figure 1:
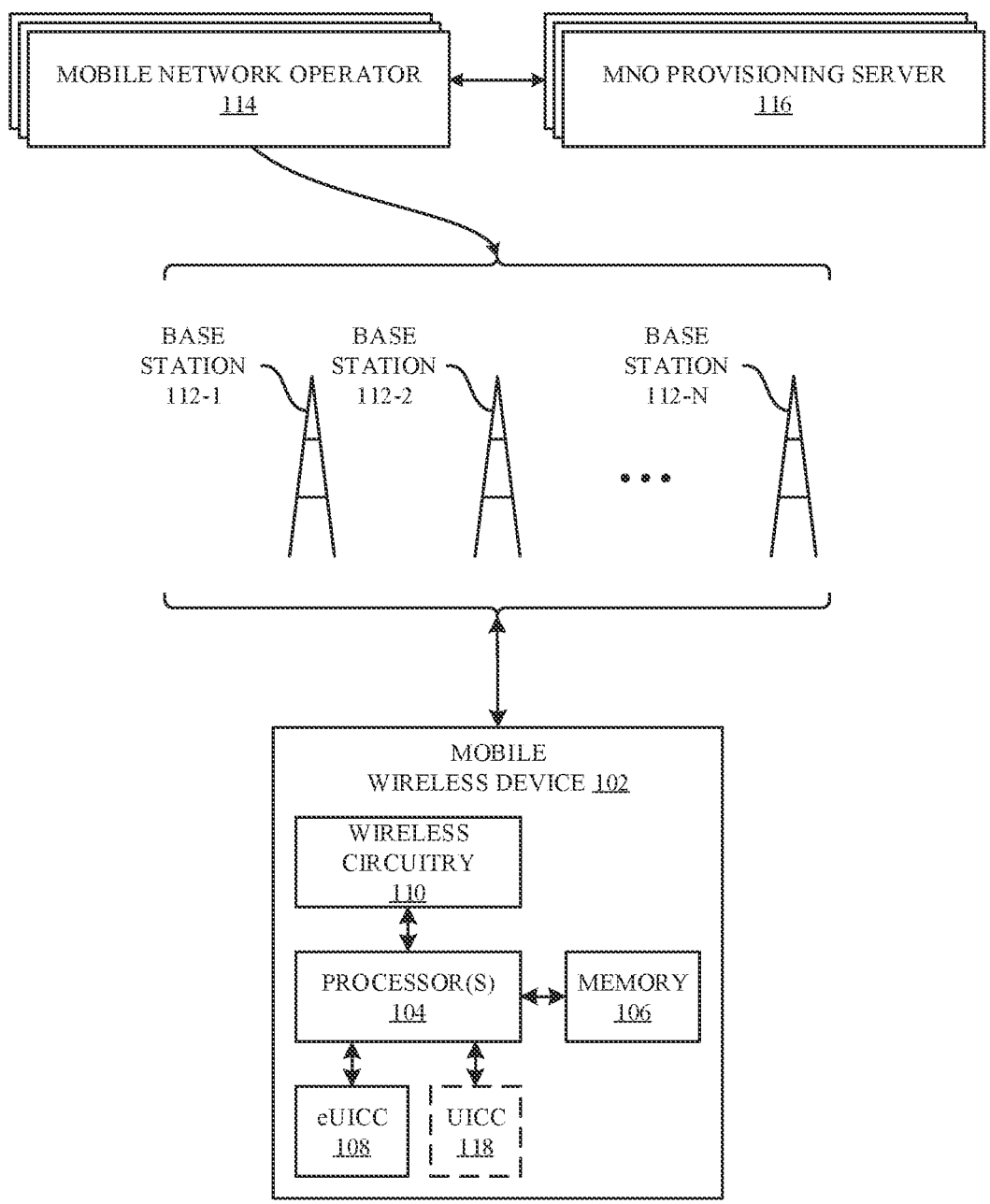
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for cloud-based cellular service management for a set of associated mobile wireless devices, including maintenance of information for one or more subscriber identity modules (SIMs) and/or electronic SIMs (eSIMs) used by the set of associated mobile wireless devices. Each mobile wireless device in the set of associated mobile wireless devices can be associated with a common user account (or with a set of associated user accounts) managed by a cloud-based service, e.g., an iCloud® account that is network accessible to the set of mobile wireless devices via cloud-based network servers. A mobile wireless device can sign into the common user account and upload information for the mobile wireless device or download information for any mobile wireless device in the set of associated mobile wireless devices. Each mobile wireless device can upload to the cloud-based network servers an encrypted version of a device cellular service profile table that includes device information and cellular service profile information for the mobile wireless device. A local cached copy of the device cellular service profile table is also stored at the mobile wireless device. There is a one-to-one mapping of device cellular service profile tables stored by the cloud-based service and associated mobile wireless devices. Each mobile wireless device can update its own device cellular service profile table but cannot modify cellular service profile tables for other associated mobile wireless devices. Device information can include a list of device-specific identifiers for the mobile wireless device, such as a universally unique identifier (UUID), a device type identifier, one or more device hardware identifiers, e.g., international mobile equipment identifiers (IMEIs), and/or an eUICC identifier (EID). The cellular service profile information can include an array of identifiers and features for cellular service profiles, including for physical card SIMs and/or for eSIMs on an eUICC of the mobile wireless device. Cellular service profile identifiers can include international circuit card identifiers (ICC-IDs) for SIMs/eSIMs, MNO identifiers, phone numbers, and the like. Specific features of the cellular service profiles can also be included in the cellular service profile information, such as whether the cellular service profile is active and whether the cellular service profile is transferrable to another mobile wireless device. The encrypted device cellular service profile tables stored by the cloud-based service can be accessible to any mobile wireless device of the set of associated mobile wireless devices for management of cellular service profiles used by the mobile wireless device.

The device and cellular service profile information of the device cellular service profile tables can be used to determine available cellular service profiles to transfer from one mobile wireless device to another mobile wireless device within the set of associated mobile wireless devices. Transfer can occur even when two mobile wireless devices are not within proximity of each other, e.g., by communicating at least in part via the cloud-based service. A mobile wireless device can download and decrypt encrypted cellular service profile tables and subsequently extract and process device information and cellular service profile information to present to a user of the mobile wireless device a set of selectable options for transfer of a cellular service profile to the mobile wireless device. After transfer of a cellular service profile, the mobile wireless device can update its own device cellular service profile table and upload an encrypted version to the cloud-based service servers. The device information and the cellular service profile information can also be used i) to share cellular service profile features among the set of associated mobile wireless devices, such as family sharing of a cellular service profile's voice features and/or data features, and ii) to synchronize applicable cellular service usage, transaction history, and cellular service profile user-configured preferences among the set of associated mobile wireless devices. The device cellular service profile tables can be end-to-end encrypted, and therefore, the device information and the cellular service profile information contained in the encrypted device cellular service profile tables can be accessed only via decryption by a mobile wireless device, which can be required to be signed into the associated user account of the cloud-based service to access the device information and the cellular service profile information. In some embodiments, multiple-factor authentication is used to ensure data protection and privacy of the device information and the cellular service profile information. In some embodiments, a blacklist table that lists combinations of cellular service profiles and mobile wireless devices can be also maintained at the cloud-based service to use for filtering cellular service profile lists to improve accurate presentation of transferable cellular service profiles. A mobile wireless device that receives transfer of a cellular service profile, e.g., a target device, can add an entry to the blacklist table, after successful transfer of the cellular service profile, where the entry is based on a combination of the cellular service profile and the mobile wireless device from which the cellular service profile was transferred, e.g., a source device. In some embodiments, a mobile wireless device can remove a previously entered combination of a cellular service profile and the mobile wireless device from the blacklist table, such as after successful transfer of the cellular service profile to the mobile wireless device. In some embodiments, a mobile wireless device that receives transfer of a cellular service profile, e.g., the target device, can determine whether a device cellular service profile table of another mobile wireless device in the set of associated mobile wireless devices includes the cellular service profile in its device cellular service profile table based on a phone number matching algorithm, and when a match is found, add an entry to the blacklist table for a combination of the another mobile wireless device and the cellular service profile transferred to the mobile wireless device. In some embodiments, a target device that receives transfer of a physical SIM card can be restricted from using the phone number matching algorithm to add an entry to the blacklist. In some embodiments, a user can cause an entry to be added to the blacklist, such as responsive to an indication that a cellular service profile is not transferrable to the mobile wireless device, e.g., when an MNO does not support a transfer of the cellular service profile to the mobile wireless device.

These and other embodiments are discussed below with reference to FIGS. 1-9; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of MNO provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®) or a cellular-capable wearable device (e.g., an Apple Watch), the base stations 112-1 to 112-n can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO 114, an eSIM is reserved for subsequent download and installation to the eUICC 108. In some embodiments, the eUICC 108 obtains one or more eSIMs from one or more associated MNO provisioning servers 116. The MNO provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

Figure 2:
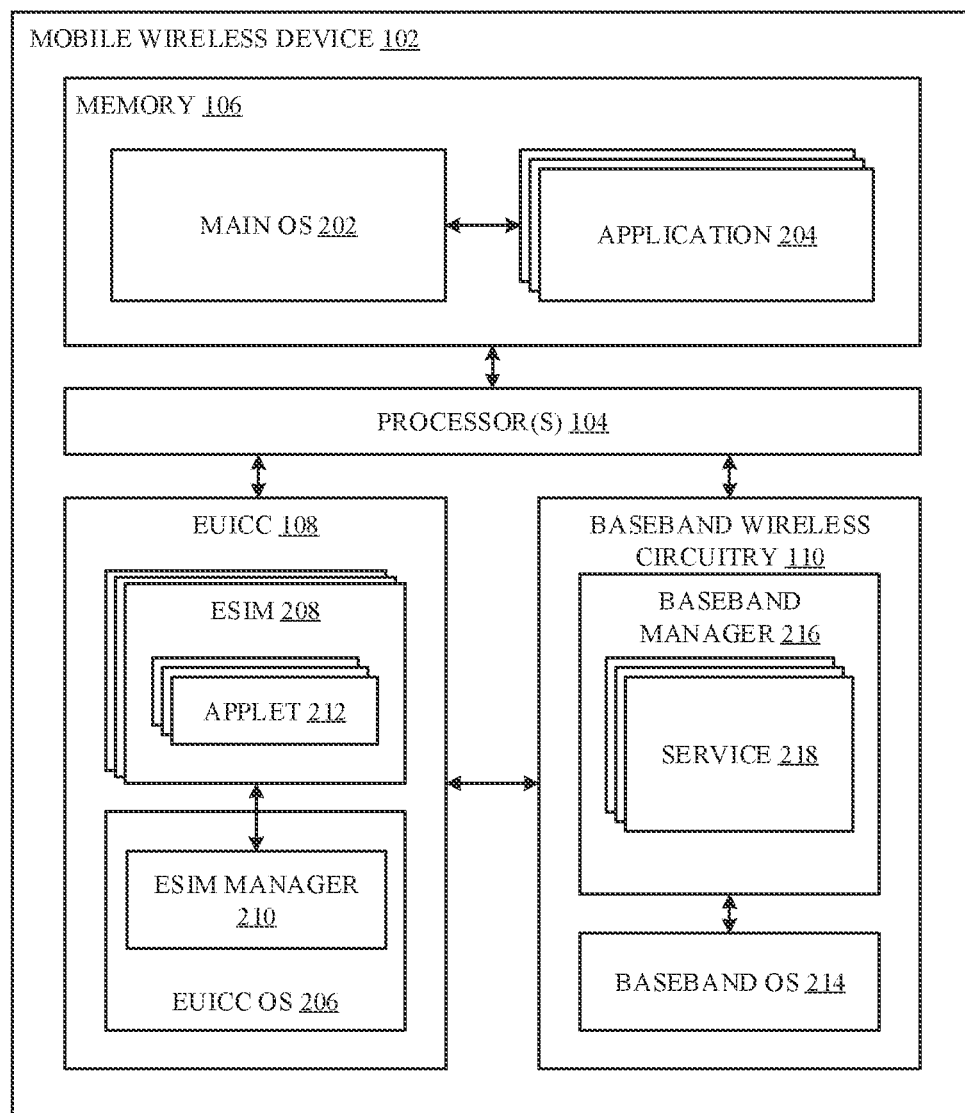
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
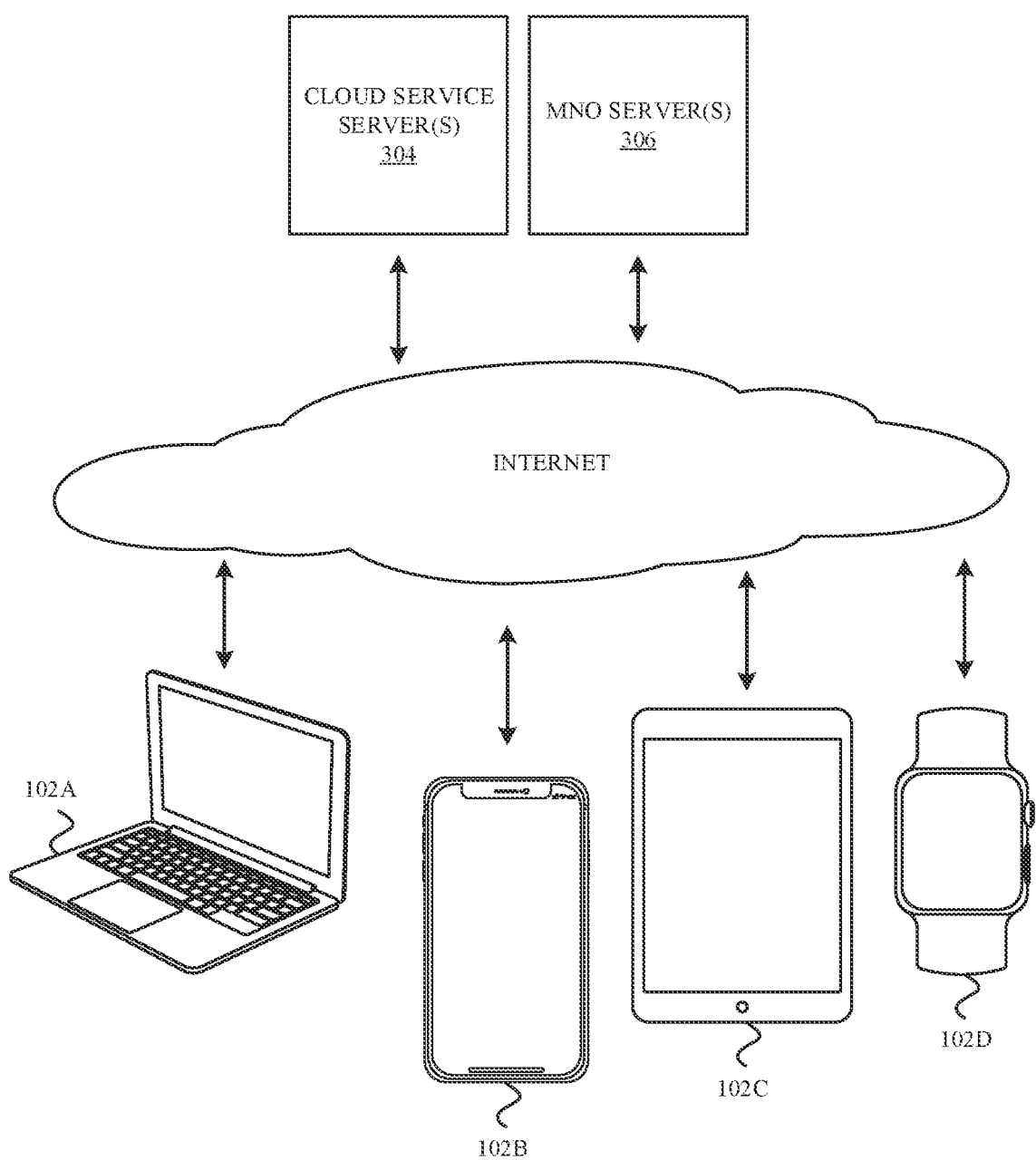
FIGS. 3A and 3B illustrate block diagrams of an exemplary system for managing cellular service profiles for a set of mobile wireless devices, according to some embodiments.
Figure 3B:
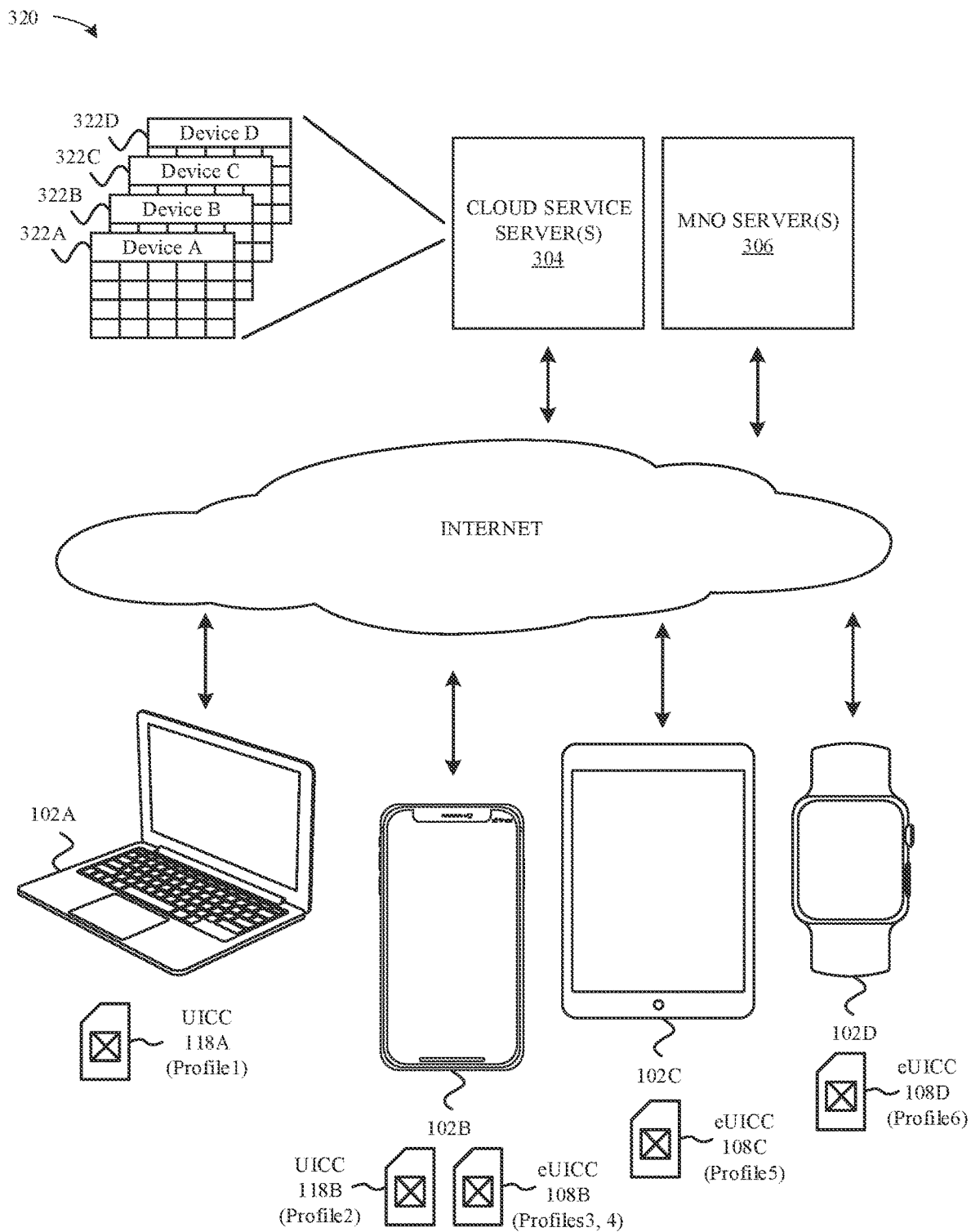

FIGS. 3A and 3B illustrate diagrams 300, 320 of an exemplary system for managing cellular service profiles for a set of mobile wireless devices 102 that can include any combination of different types of mobile wireless devices 102 that can support cellular connectivity. For example, the set of mobile wireless devices 102 can include a cellular-capable laptop computer 102A, a mobile phone 102B, a cellular-capable tablet computer 102C, and a cellular-capable wearable device 102D. Cellular capability for the mobile wireless devices 102A-102D can be based on SIM cards (UICCs) 118 and/or on eSIMs 208 included on eUICCs 108. The mobile wireless devices 102A, 102B, 102C, 102D can each be associated with a common user account, e.g., a cloud-based service account, such as an iCloud® account that is network accessible to the mobile wireless devices 102 via Internet data connections to a cloud-based network server 304. Each mobile wireless device 102 can sign into a common user account and upload to a cloud-based network server 304 an encrypted version of its own device cellular service profile table that encapsulates device information and cellular service profile information for the mobile wireless device 102. A local cached copy of the device cellular service profile table is also stored at the mobile wireless device 102. There is a one-to-one mapping of device cellular service profile tables stored by the cloud-based network servers 304 and associated mobile wireless devices 102. For example, the device cellular service profile table 322A for mobile wireless device 102A can include device information for the mobile wireless device 102A and profile information for one or more profiles, e.g., profile1, on UICC 118A included in the mobile wireless device 102A. Similarly, the device cellular service profile tables 322B, 322C, and 322D can include device information and profile information for respective mobile wireless devices 102B, 102C, and 102D. As shown, mobile wireless device 102B includes both a UICC 118B and an eUICC 108B, and the profiles stored on each, e.g., profile2 on UICC 118B, profiles 3, 4 on eUICC 108B, can be included in the profile information of device cellular service profile table 322D stored at the cloud-based network servers 304. The device cellular service profile table 322C for mobile wireless device 102C can include profile information for one or more profiles, e.g., profile5, stored on eUICC 108C, while the device cellular service profile table 322D for mobile wireless device 102D can include profile information one or more profiles, e.g., profile6, stored on eUICC 108D. Each mobile wireless device 102 can update its own device cellular service profile table but cannot modify device cellular service profile tables for other associated mobile wireless devices 102. When a mobile wireless device 102 becomes disconnected from the cloud-based service account, e.g., when signed out or powered down, the device cellular service profile table stored in the cloud-based network servers 304 can cease to be updated.

FIG. 3C illustrates an exemplary device cellular service profile table structure 330 for a device cellular service profile table 322 for managing device information and cellular service profile information of a mobile wireless device 102. The device cellular service profile table structure 330 includes a list of device-specific identifiers for the mobile wireless device 102, e.g., a device identifier for communication, such as a universally unique identifier (UUID), a device type identifier, e.g., a model name, a user-selected device identifier, e.g., a display name, one or more mobile network operator (MNO) device hardware identifiers, e.g., international mobile equipment identifiers (IMEIs), a device software identifier, e.g., an operating system (OS) version, and an eUICC identifier (EID) for an eUICC 108 on which one or more eSIMs 208 are stored for the mobile wireless device 102. Note that MNOs 114 may use IMEIs to refer to unique combinations of i) a mobile wireless device 102 and ii) a SIM card (UICC 118) or eSIM 208 contained therein, and as such, a mobile wireless device 102 that includes multiple SIM cards (UICCs 118) and/or eSIMs 208 stored on an eUICC 108 can be associated with multiple IMEI values. The device cellular service profile table structure 330 also includes an array of identifiers and features for cellular service profiles, including for both physical card SIMs (UICCs 118) and/or for eSIMs 208 on an eUICC 108 of the mobile wireless device 102. Cellular service profile information for each SIM card (UICC 118) or eSIM 208 on an eUICC 108 can include an associated ICCID value, a phone number, an MNO identifier (name), a user-selected cellular service profile identifier (label), a mobile country code (MCC) value, a mobile network code (MNC) value, and general identifier (GID1, GID2) values. The cellular service profile information for a SIM card (UICC 118) or eSIM 208 can also include a first indication (e.g., a value for a first Boolean variable 'Is_Physical_SIM_Card') of whether the cellular service profile is for a physical SIM card (UICC 118), and a second indication (e.g., a value for a second Boolean variable 'Is Profile Active') of whether the cellular service profile is active (e.g., activated by the associated MNO 114 and usable for access to cellular wireless service by the mobile wireless device 102). The cellular service profile information for an eSIM 208 can further include information about features of the eSIM 208, which can be formatted in list. As an example, the device cellular service profile table structure 330 includes a list labeled 'iPhone_eSIM_Transfer_Feature_Information' to summarize information about transferability of an eSIM 208, such as whether transfer of the eSIM 208 is supported or, if not supported, a reason for the lack of support for transfer of the eSIM 208. The transfer feature information can also include types of transfers that are supported, such as via an MNO web-sheet server based transfer process or via a one-click on-device transfer process. The transfer feature information can also include a transfer token that can be used to indicate authorization to transfer the eSIM 208. Additional features of the eSIM 208 can be included in the device cellular service profile table by adding additional feature lists to the device cellular service profile table structure 330 illustrated in FIG. 3C. For example, cellular service plan usage information, cellular service profile settings, and/or user-selected cellular service profile preferences can also be included, in some embodiments. Encrypted versions of the device cellular service profile tables stored by the cloud-based service can be accessible to one or more mobile wireless devices 102 of the set of associated mobile wireless devices for management of cellular service profiles used by the mobile wireless device 102. End-to-end encryption for data stored by a cloud-based service can be enabled when two-factor authentication is enabled for the cloud-based service account. In some embodiments, encrypted device cellular service profile tables can only be uploaded when two-facture authentication is enabled for the cloud-based service account. To further protect user privacy, an uploaded, encrypted device cellular service profile table can be referenced by a unique ID value, e.g., a UUID, for the mobile wireless device 102.

Figure 3D:
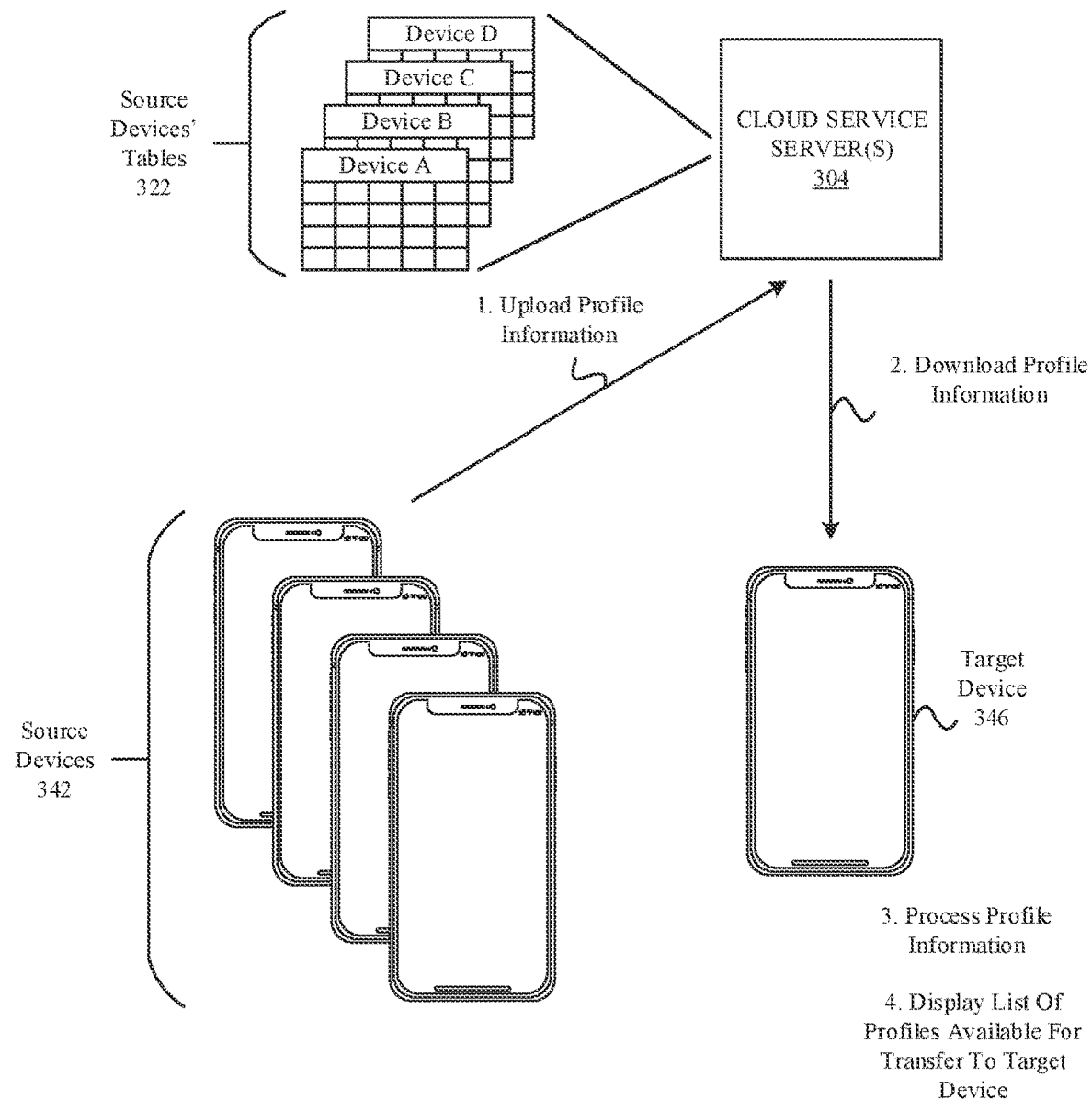
FIG. 3D illustrates an exemplary use case for transfer of a cellular service profile among a set of mobile wireless devices, according to some embodiments.

FIG. 3D illustrates a diagram 340 of an exemplary use case for transfer of a cellular service profile among a set of mobile wireless devices, e.g., a set of source devices 342 and a target device 346, using cloud-based network servers 304. Each mobile wireless device 102 of the set of source devices 342 can upload encrypted versions of their respective device cellular service profile tables 322. The target device 346 can download the encrypted device cellular service profile tables 322, decrypt the device cellular service profile tables 322 to extract the information contained therein, and process the information to produce a list of cellular service profiles available for transfer to the target device 346. The target device 346 can use the information contained in the device cellular service profile tables 322 i) to determine and only list those cellular service profiles that are available for transfer and ii) to include information for easy identification of a cellular service profile to transfer by a user of the target device 346. The downloaded information can also be used to perform actions such as restoring user-selected preferences and determining cellular service profile usages. The target device 346 can obtain the information without requiring proximity between the target device 346 and the set of source devices 342.

Figure 4A:
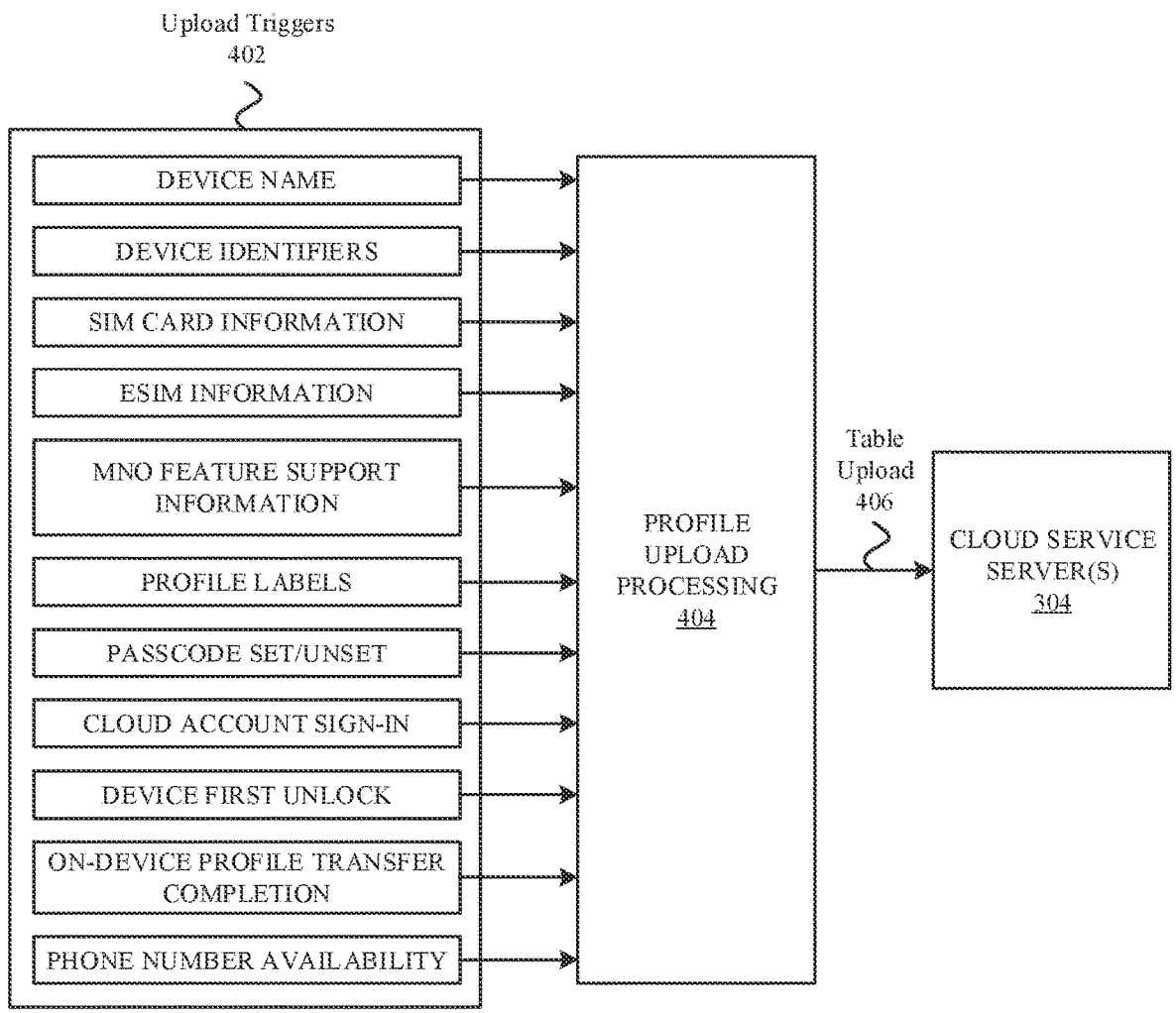
FIGS. 4A and 4B illustrate diagrams of an exemplary set of upload triggers to process and update a device cellular service profile table, according to some embodiments.

FIG. 4A illustrates a diagram 400 of a set of upload triggers 402 that the mobile wireless device 102 can process to determine updates for a corresponding device cellular service profile table 322. Example upload triggers 402 can include a device name (e.g., a user-selected label) for the mobile wireless device 102, one or more hardware identifiers and/or software device identifiers, e.g., IMEI values, mobile equipment identifier (MEID) value, eUICC identifier (EID) value, etc., physical SIM card (UICC 118) information, such as when a physical SIM card (UICC 118) is inserted or removed, eSIM 208 information, e.g., when an eSIM 208 is enabled or disabled, MNO feature support information, user-generated cellular service profile labels, device passcode status information, e.g., whether a device passcode is set or not set, and a type of passcode used, cloud-based service account status, e.g., whether a device is signed in or signed out of the cloud-based service account using two-factor authentication, a first device unlock status after a power on, an on-device cellular service profile transfer completion indication, and an availability of a phone number associated with a SIM/eSIM. The upload triggers 402 can be processing by a profile upload processing module 404 to determine whether there are any changes to a device cellular service profile table 322 for the mobile wireless device 102. When the device cellular service profile table 322 is updated, based on the upload triggers 402, an encrypted version of the updated device cellular service profile table 322 can be uploaded to the cloud-based network servers 304. As there are many upload triggers 402 that can result in a change to the device cellular service profile table 322, the mobile wireless device 102 can use a hysteresis timer mechanism as part of the profile upload processing module 404 to accumulate multiple changes to the device cellular service profile table 322 before uploading an updated version to the cloud-based network servers 304.

Figure 4B:
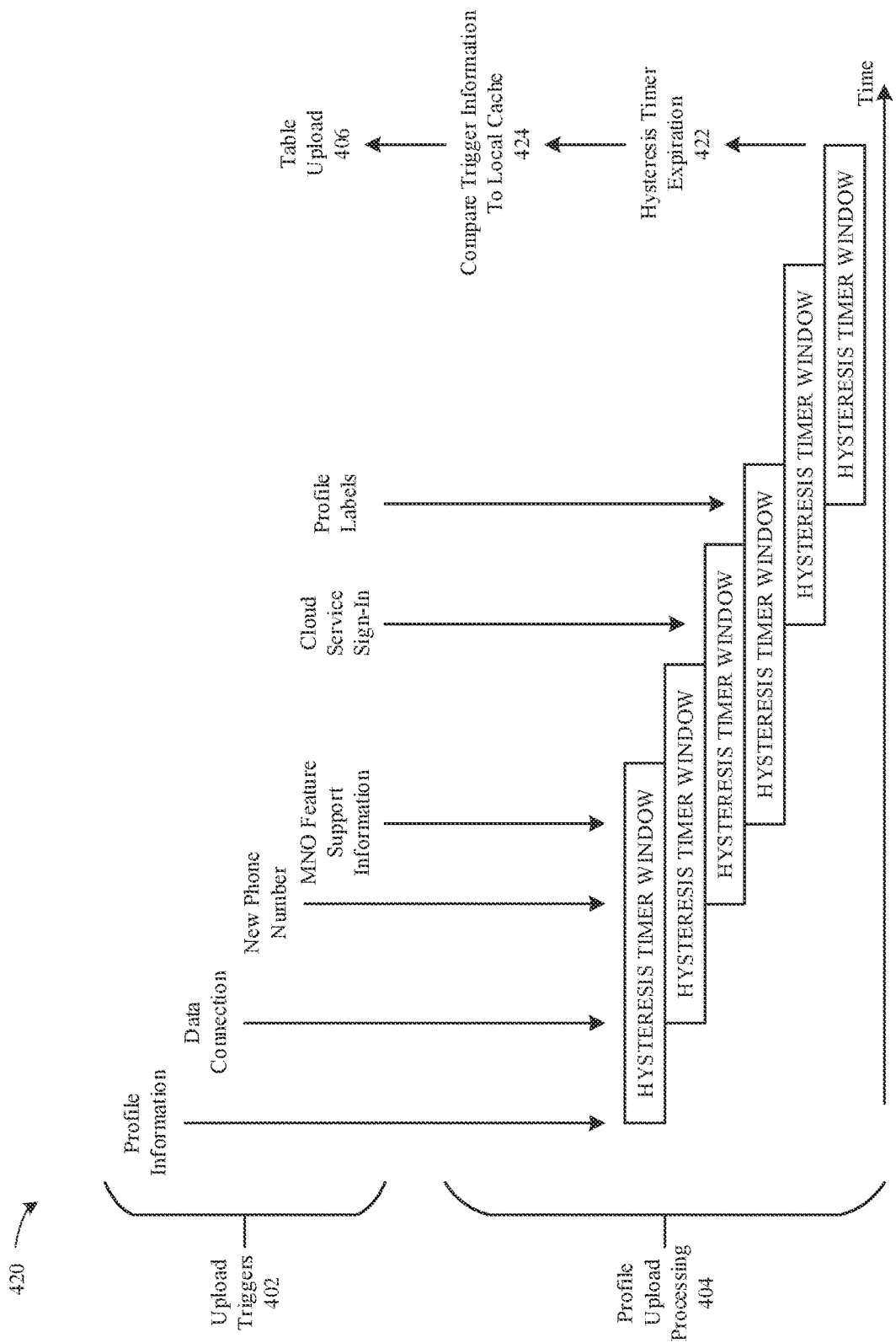

FIG. 4B illustrates a diagram 420 of processing of upload triggers 402 with hysteresis. For each upload trigger 402, a hysteresis timer can be started (or re-started if already running) to allow at least a pre-determined time period to elapse following the most recently received upload trigger 402 before upload 406 of an updated device cellular service profile table 322 occurs. The profile upload processing module 404 can accumulate information from multiple upload triggers 402 and, after expiration of the hysteresis timer, at 422, process the accumulated information to compare the upload trigger information, at 424, to information stored in a locally cached version of the device cellular service profile table 322 to determine whether the device cellular service profile table 322 requires updating. When the device cellular service profile table 322 has changed resulting from the accumulated upload trigger information, at 406, the mobile wireless device 102 can upload an encrypted version of the updated device cellular service profile table 322 to the cloud-based network servers 304.

Figure 4C:
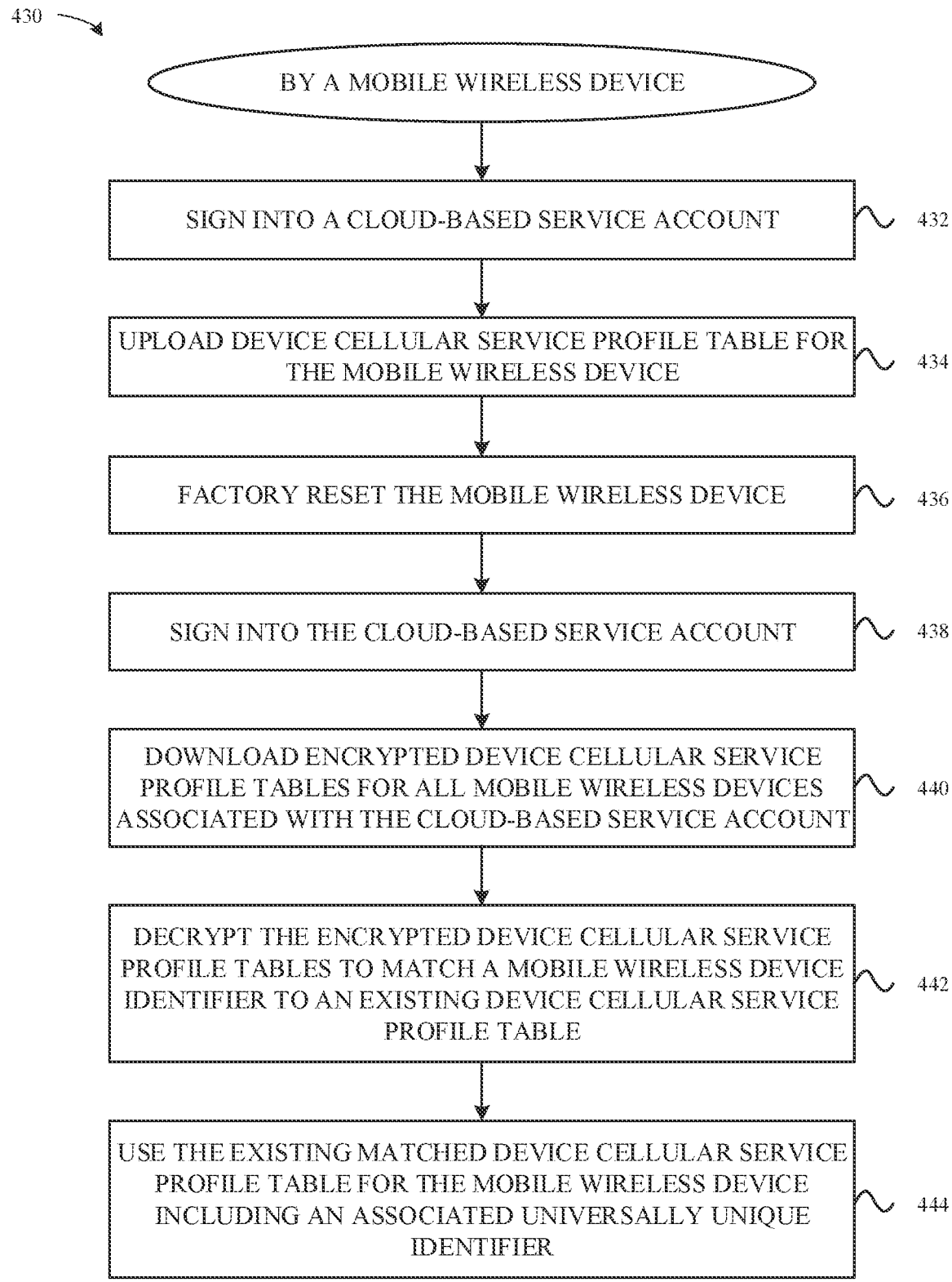
FIG. 4C illustrates a flowchart of a set of actions to reuse a device cellular service profile table after factory reset of a mobile wireless device, according to some embodiments.

FIG. 4C illustrates a flowchart 430 of a set of actions performed by a mobile wireless device 102 to reuse a previous device cellular service profile table 322. In some embodiments, the mobile wireless device 102 generates a universally unique identifier (UIUD) with which to identify the mobile wireless device 102. The UUID value for the mobile wireless device 102 can be used to label the encrypted version of the device cellular service profile table 322 stored at the cloud-based network servers 304. After a re-boot of the mobile wireless device 102 from a factory reset, a locally stored cached version of the device cellular service profile table 322 can be erased. A previously uploaded, encrypted version of the device cellular service profile table 322 can be retrieved and reused (at least in part) for the mobile wireless device 102. The mobile wireless device 102, at 432, can sign into an associated cloud-based service account and, at 434, upload an encrypted version of the device cellular service profile table 322. Subsequently, at 436, the mobile wireless device 102 can be reset to an original factory setting. At 438, the mobile wireless device 102 can be signed into the same cloud-based service account as previously used. At 440, the mobile wireless device 102 can download encrypted versions of all device cellular service profile tables 322 stored at the cloud-based network servers 304 for the cloud-based service account. The device cellular service profile tables 322 can be decrypted, at 442, and the mobile wireless device 102 can determine whether an identifier value of the mobile wireless device 102, e.g., an IMEI value, matches to a corresponding identifier value in one of the device cellular service profile tables 322. When a match occurs, the mobile wireless device, at 444, can use the device cellular service profile table 322 that matches and use a UUID value used to label the device cellular service profile table as the UUID value for the mobile wireless device 102. The process illustrated in FIG. 4C provides for restoring device information and cellular service profile information for the mobile wireless device 102 after a factory reset and association with (by signing into) a previously used cloud-based service account.

As described herein, a mobile wireless device 102, signed in with two-factor authentication to a cloud-based service account, can download encrypted versions of device cellular service profile tables 322 for a set of associated mobile wireless devices 102 associated with the cloud-based service account. Information extracted from the downloaded cellular service profile tables 322 can be used to list a set of transferable cellular service profiles from one or more mobile wireless devices 102 in the set of associated mobile wireless devices. After user selection and transfer of a cellular service profile from a source mobile wireless device 102 to a target mobile wireless device 102, MNO infrastructure servers 306 can update information for the transferred cellular service profile transferred, e.g., by activating the cellular service profile on the target mobile wireless device 102 and by deactivating the cellular service profile on the source mobile wireless device 102. The source mobile wireless device 102, however, in some circumstances, may not update (or be unable to update) its own device cellular service profile table 322 stored at the cloud-based network servers 304. As such, a cellular service profile can be included in both a first device cellular service profile table 322 of the source mobile wireless device 102 and in a second device cellular service profile table of the target mobile wireless device 102. When another mobile wireless device 102 of the set of mobile wireless devices 102 associated with the cloud-based service account downloads all of the device cellular service profile tables 322 from the cloud-based network servers 304, a cellular service profile, and more particularly an identification of a cellular service profile, such as a phone number, can be duplicated and appear to be available for transfer from two different mobile wireless devices 102. As the inactive cellular service profile indicated in the source mobile wireless device's device cellular service profile table 322 is not in fact available for transfer, a transfer error can occur if the user selects the inactive cellular service profile to transfer. Duplicate phone numbers can result from a number of other conditions as well, such as when a cellular service profile is transferred off-line (out-of-band) from the cloud-based service account. For example a previous physical SIM card can be replaced with a new physical SIM card, or an MNO can provide a new quick response (QR) code to install a cellular service profile. To address the duplicate cellular service profile problem, a blacklist table can be used to keep track of inactive cellular service profiles and to filter the device information and the cellular service profile information to eliminate inactive cellular service profiles from a list of transferable cellular service profiles.

FIG. 5A illustrates an exemplary blacklist table entry structure 500. A blacklist can be maintained at the cloud-based network servers 304 for all of the mobile wireless devices 102 associated with a common cloud-based service account. The blacklist table can include entries for individual combinations of a first mobile wireless device 102 and an inactive cellular service profile for the first mobile wireless device 102. Each entry can include information for the first mobile wireless device 102, e.g., an ICCID specifying an eSIM 208 or physical SIM card (UICC 118) from the first mobile wireless device 102, an eUICC ID (EID) value for an eUICC 108 of the first mobile wireless device 102 from which an eSIM 208 was transferred, and a device hardware identifier, e.g., an IMEI value for the first mobile wireless device 102 to account for transfer of a physical SIM card (UICC 118) from the first mobile wireless device 102. The blacklist table entry can also include information from a second mobile wireless device 102, which added the entry to the blacklist table. The entry can include one or more hardware identifiers for the second mobile wireless device 102, such as EID and IMEI values. In some cases, the first mobile wireless device 102 can be a source mobile wireless device 102 from which the cellular service profile was transferred, and the second mobile wireless device 102 can be a target mobile wireless device 102 to which the cellular service profile was transferred. The blacklist table entry can be generated by the target mobile wireless device 102, after transfer of the cellular service profile, and uploaded to the blacklist table maintained at the cloud-based network servers 304. In some cases, the first mobile wireless device 102 is identified based on a phone number matching algorithm performed by a target mobile wireless device 102 during a transfer process, where a duplicate phone number is found when processing the device information and the cellular service profile information extracted from the downloaded device cellular service profile tables. As a source mobile wireless device 102, after deactivation of a transferred cellular service profile, can lose connectivity to the cloud-based network servers 304, the target mobile wireless device 102 generates and uploads the blacklist table entry rather than the source mobile wireless device 102. The blacklist table entries can be used to identify inactive cellular service profiles by a mobile wireless device 102 and to filter out these inactive cellular service profiles when generating and displaying a list of transferable cellular service profiles.

Figure 5B:
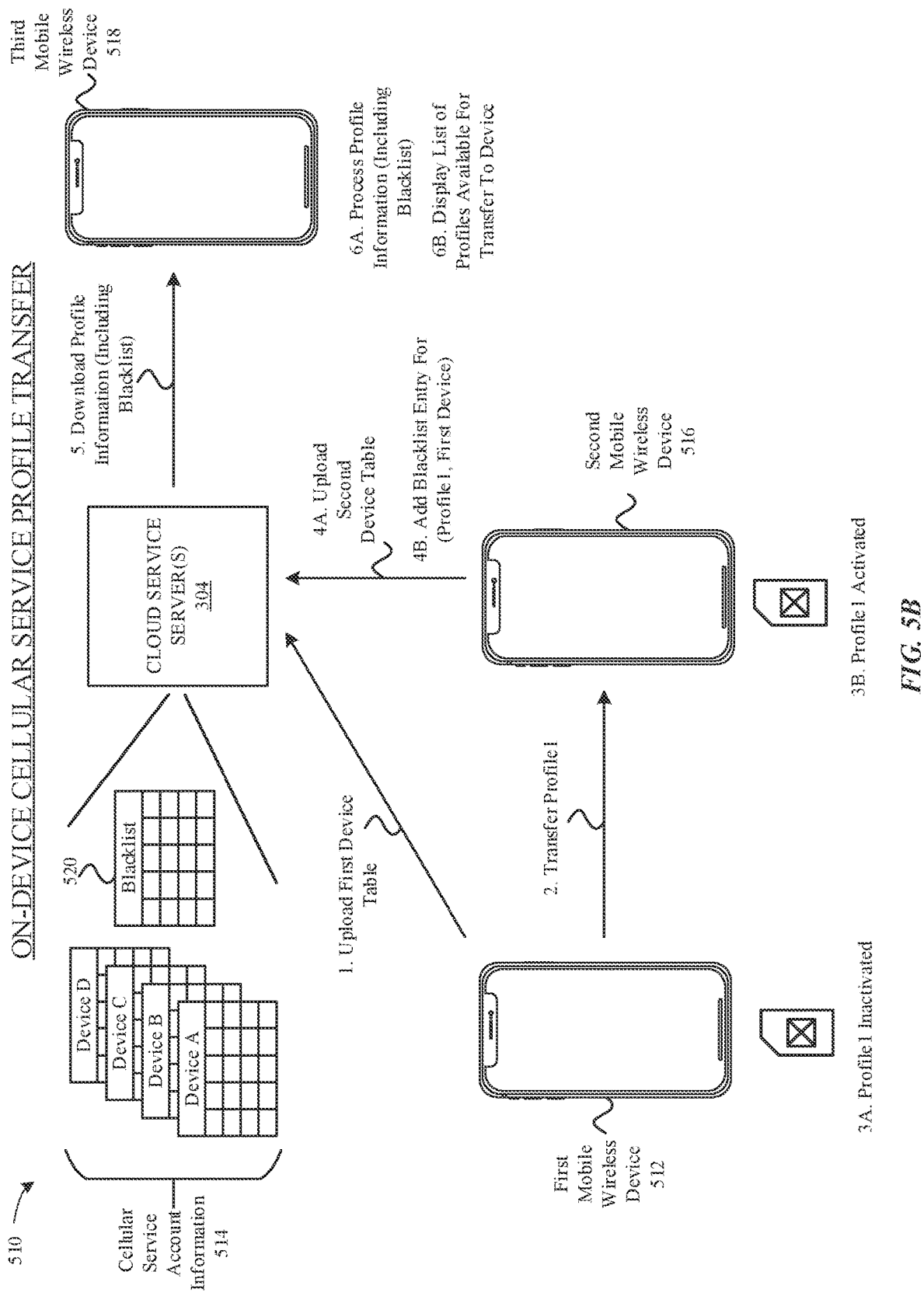
FIG. 5B illustrates a diagram of an example of an on-device transfer of a cellular service profile between mobile wireless devices with blacklist usage, according to some embodiments.

FIG. 5B illustrates a diagram 510 of an example of an on-device transfer of a cellular service profile between mobile wireless devices 512, 516 with usage of cellular service account information 514 including device cellular service profile tables 322 and a blacklist 520. A first mobile wireless device 512 that includes a cellular service profile (profile1) can sign into a cloud-based service account and upload an encrypted version of a device cellular service profile table 322 for the first mobile wireless device 512. Subsequently, the cellular service profile (profile1) can be transferred from the first mobile wireless device 512 to a second mobile wireless device 516 via an on-device cellular service profile transfer process. Examples of on-device cellular service profile transfers can include communication between the mobile wireless devices 512, 516 i) with a direct communication path between them, such as when within close physical proximity to each other using a wireless personal area network connection, a wireless local area network connection, or a peer-to-peer connection, or ii) with an indirect communication path between them through one or more network-based servers. In addition, the on-device cellular service profile transfer includes communication between the mobile wireless devices 512, 516 and one or more MNO infrastructure servers (not shown). As part of the on-device cellular service profile transfer, the cellular service profile (profile1) can be inactivated by the MNO infrastructure servers at the first mobile wireless device 512 and activated at the second mobile wireless device 516. The second mobile wireless device 516 uploads an updated device cellular service profile table for the second mobile wireless device 516, including information for the newly transferred cellular service profile (profile1) to the cloud-based network servers 304. The second mobile wireless device 516 can also add an entry to the blacklist 520 that references a combination of the first mobile wireless device 512 and the cellular service profile (profile1) that transferred therefrom. Subsequently, a third mobile wireless device 518 downloads the cellular service account information 514, including device cellular service profile tables 322 for the first mobile wireless device 512 and for the second mobile wireless device 516, as well as the blacklist 520. The third mobile wireless device 518 processes information extracted from the device cellular service profile tables 322 and the blacklist 520 and subsequently displays a list of transferable cellular service plans for user selection. The displayed list can include the active cellular service profile (profile1) at the second mobile wireless device 516 and can exclude the corresponding inactive cellular service profile (profile1) at the first mobile wireless device 512 based on information included in the blacklist 520.

Figure 5C:
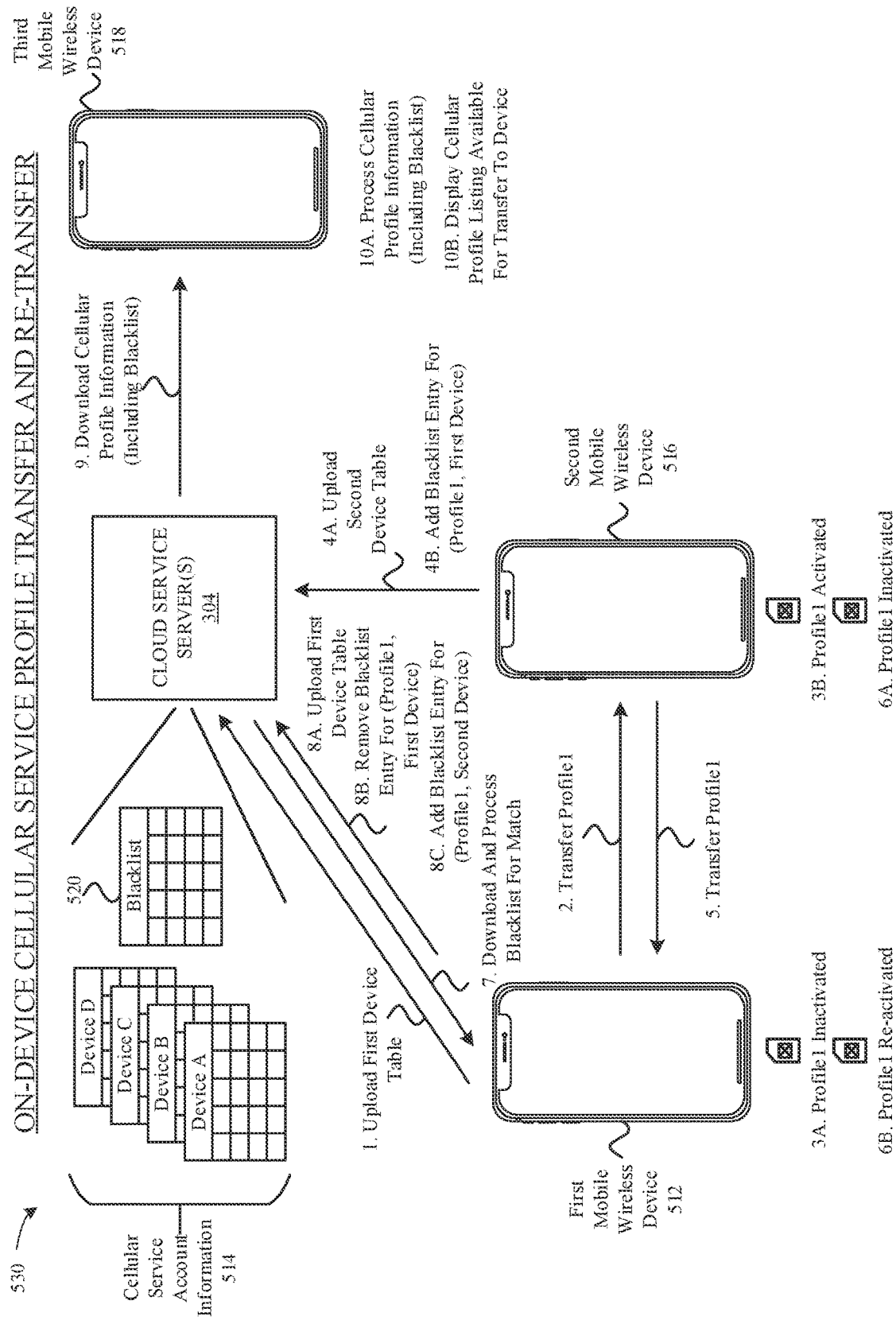
FIG. 5C illustrates a diagram of an example of an on-device transfer and subsequent re-transfer of a cellular service profile between mobile wireless devices with blacklist usage, according to some embodiments

FIG. 5C illustrates a diagram 530 of an example of on-device cellular service profile transfer and subsequent re-transfer of the cellular service profile (profile1) between mobile wireless devices 512, 516 with usage of cellular service account information 514 including device cellular service profile tables 322 and a blacklist 520. A first mobile wireless device 512 that includes a cellular service profile (profile1) can sign into a cloud-based service account and upload an encrypted version of a device cellular service profile table 322 for the first mobile wireless device 512. Subsequently, the cellular service profile (profile1) can be transferred from the first mobile wireless device 512 to a second mobile wireless device 516 via an on-device cellular service profile process. As part of the transfer, the cellular service profile (profile1) can be inactivated by MNO infrastructure servers (not shown) at the first mobile wireless device 512 and activated at the second mobile wireless device 516. The second mobile wireless device 516 uploads an updated device cellular service profile table 322 for the second mobile wireless device 516, including information for the newly transferred cellular service profile (profile1) to the cloud-based network servers 304. The second mobile wireless device 516 can also add an entry to the blacklist 520 that references a combination of the first mobile wireless device 512 and the cellular service profile (profile1) that transferred therefrom. Subsequently, the cellular service profile (profile1) can be re-transferred from the second mobile wireless device 516 back to the first mobile wireless device 512 via a second on-device cellular service profile transfer. As part of the re-transfer, the cellular service profile (profile1) can be inactivated by MNO infrastructure servers (not shown) at the second mobile wireless device 516 and re-activated at the first mobile wireless device 512. The first mobile wireless device 512 downloads the blacklist 520 and locates a combination of the first mobile wireless device 512 and the re-transferred cellular service profile (profile1) in the downloaded blacklist 520 that resulted from the initial transfer of the cellular service profile (profile1) to the second mobile wireless device 516. The first mobile wireless device 512 uploads an updated device cellular service profile table 322 for the first mobile wireless device 512, including information for the re-transferred cellular service profile (profile1) to the cloud-based network servers 304. The first mobile wireless device 512 also removes the entry in the blacklist 520 that references the combination of the first mobile wireless device 512 and the cellular service profile (profile 1) that resulted from the initial transfer to the second mobile wireless device 516. The first mobile wireless device 512 also adds an entry to the blacklist 520 that references a combination of the second mobile wireless device 516 and the cellular service profile (profile1) resulting from the re-transfer of the cellular service profile (profile1) from the second mobile wireless device 516 to the first mobile wireless device 512. Subsequently, a third mobile wireless device 518 downloads the cellular service account information 514, including device cellular service profile tables 322 for the first mobile wireless device 512 and for the second mobile wireless device 516, as well as the blacklist 520. The third mobile wireless device 518 processes information extracted from the device cellular service profile tables 322 and the blacklist 520 and subsequently displays a list of transferable cellular service plans for user selection. The displayed list can include the active cellular service profile (profile1) at the second mobile wireless device 516 and can exclude the corresponding inactive cellular service profile (profile1) at the first mobile wireless device 512 based on information included in the blacklist 520.

Figure 5D:
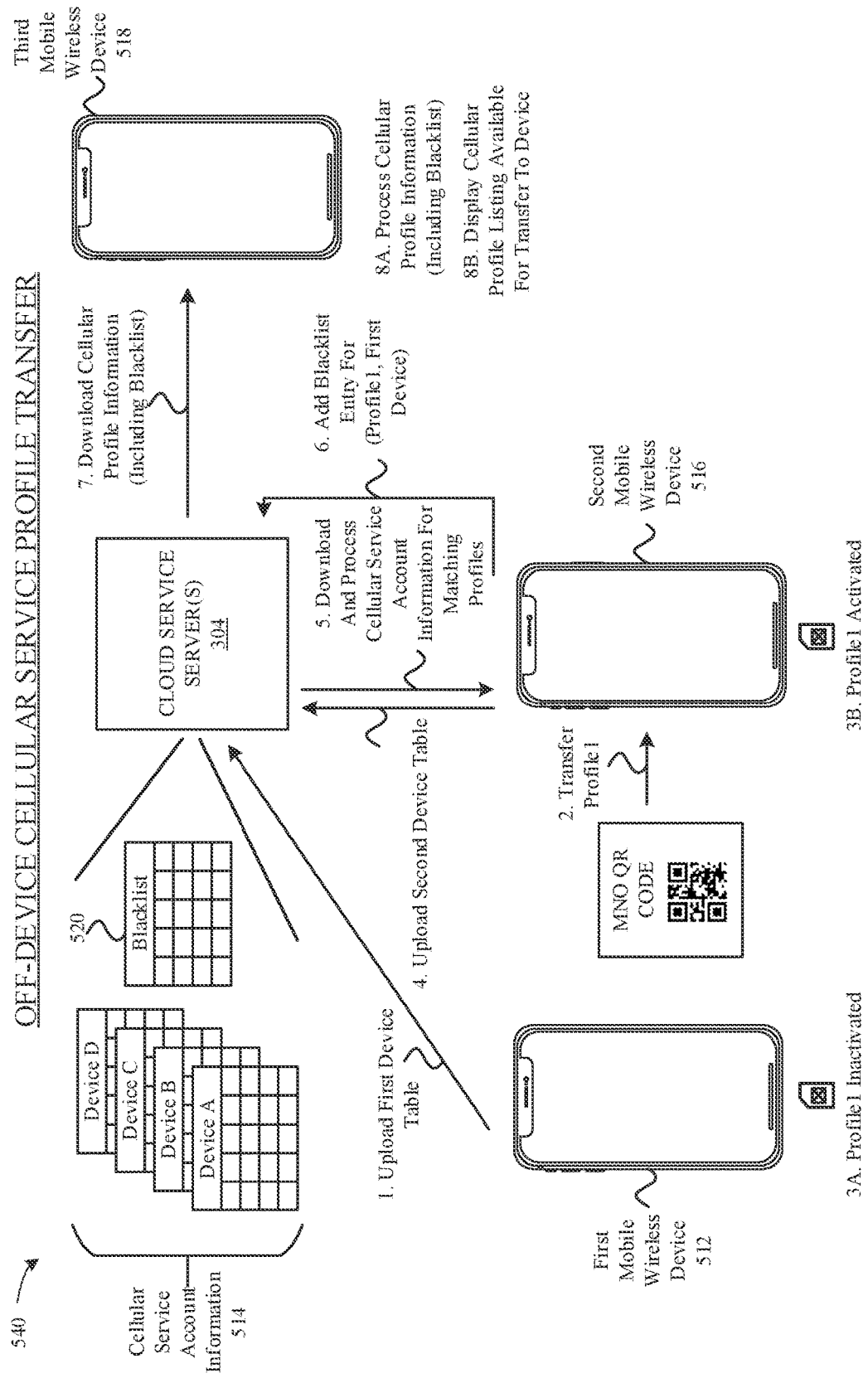
FIG. 5D illustrates a diagram of an example of an off-device transfer of a cellular service profile between mobile wireless devices with blacklist usage, according to some embodiments.

FIG. 5D illustrates an example of an off-device transfer of a cellular service profile between mobile wireless devices 512, 516 with usage of cellular service account information 514 including device cellular service profile tables 322 and a blacklist 520. A first mobile wireless device 512 that includes a cellular service profile (profile1) can sign into a cloud-based service account and upload an encrypted version of a device cellular service profile table 322 for the first mobile wireless device 512. Subsequently, the cellular service profile (profile1) can be transferred from the first mobile wireless device 512 to a second mobile wireless device 516 via an off-device cellular service profile transfer process. An off-device cellular service profile transfer can occur based on interactions with an MNO 114, such as by receiving from the MNO 114 a QR code that can be scanned for installing the cellular service profile (profile1) to the second mobile wireless device 516. An off-device cellular service profile transfer can also be effected by uploading information for a cellular service profile from a first mobile wireless device 512 to an original equipment manufacturer (OEM) managed, network accessible server and subsequently by downloading the information to the second mobile wireless device 516. As part of the off-device transfer, the cellular service profile (profile1) can be inactivated by MNO infrastructure servers (not shown) at the first mobile wireless device 512 and activated at the second mobile wireless device 516.

The second mobile wireless device 516 uploads an updated device cellular service profile table 322 for the second mobile wireless device 516, including information for the newly transferred cellular service profile (profile1) to the cloud-based network servers 304. The second mobile wireless device 516 can also download and process the cellular service account information 514, including all of the device cellular service profile tables 322 for all mobile wireless devices associated with the cloud-based service account and the blacklist 520. The second mobile wireless device 516 can search the device cellular service profile tables 322 for any matching cellular service profiles to the cellular service profile (profile1) transferred to the second mobile wireless device 516. Unlike the on-device cellular service profile transfer processes illustrated in FIGS. 5B and 5C, where the second mobile wireless device 516 receives transfer of the cellular service profile (profile1) directly from the first mobile wireless device 512 and therefore has knowledge of the first mobile wireless device 512 as a source device associated with the cellular service profile (profile1), the second mobile wireless device 516 can be unaware of the previous association between the transferred cellular service profile (profile1) and the first mobile wireless device 512. The second mobile wireless device 516 can locate a match between the cellular service profile (profile1) and the first mobile wireless device 512 using information from the transferred cellular service profile (profile1), such as based on searching for a phone number of the transferred cellular service profile in the device cellular service profile tables 322. The second mobile wireless device 516 can add an entry to the blacklist 520 that references a combination of the first mobile wireless device 512 and the cellular service profile (profile1) based on finding a phone number match of the activated cellular service profile (profile1) on the second mobile wireless device 516 to the inactivated cellular service profile (profile1) on the first mobile wireless device 512. Note that the device cellular service profile table 322 for the first mobile wireless device 512 uploaded by the first mobile wireless device 512, at step 1 in FIG. 5D, can indicate that the cellular service profile (profile1) is active even though the cellular service profile is actually inactivated by the MNO 114 after the device cellular service profile table was uploaded. This can occur when the first mobile wireless device 512 does not upload (or is unable to upload) an updated device cellular service profile table 322 to the cloud-based network servers 304 after transfer of the cellular service profile. Subsequently, a third mobile wireless device 518 downloads the cellular service account information 514, including device cellular service profile tables 322 for the first mobile wireless device 512 and for the second mobile wireless device 516, as well as the blacklist 520. The third mobile wireless device 518 processes information extracted from the device cellular service profile tables 322 and the blacklist 520 and subsequently displays a list of transferable cellular service plans for user selection. The displayed list can include the active cellular service profile (profile1) at the second mobile wireless device 516 and can exclude the corresponding inactive cellular service profile (profile1) at the first mobile wireless device 512 based on information included in the blacklist 520.

In some cases, an inactive cellular service profile on a first mobile wireless device 102 can result in a false positive phone number match (based on processing of device cellular service profile tables 322 at the first mobile wireless device 102) that would result in inadvertent blacklisting of an active cellular service profile on a second mobile wireless device 102. To prevent an active cellular service profile from being inadvertently blacklisted, a mobile wireless device 102, for which a combination of the mobile wireless device 102 and a cellular service profile is included in the blacklist 520, can be restricted from adding an entry to the blacklist 520 for another mobile wireless device 102 based on phone number matching alone using information from downloaded device cellular service profile tables 322. In addition, in some embodiments, a mobile wireless device 102 that receives an off-device transfer of a cellular service profile, e.g., based on moving a physical SIM card to the mobile wireless device 102 from another mobile wireless device 102, can also be restricted from using phone number matching alone for adding an entry to the blacklist 520.

Figure 5E:
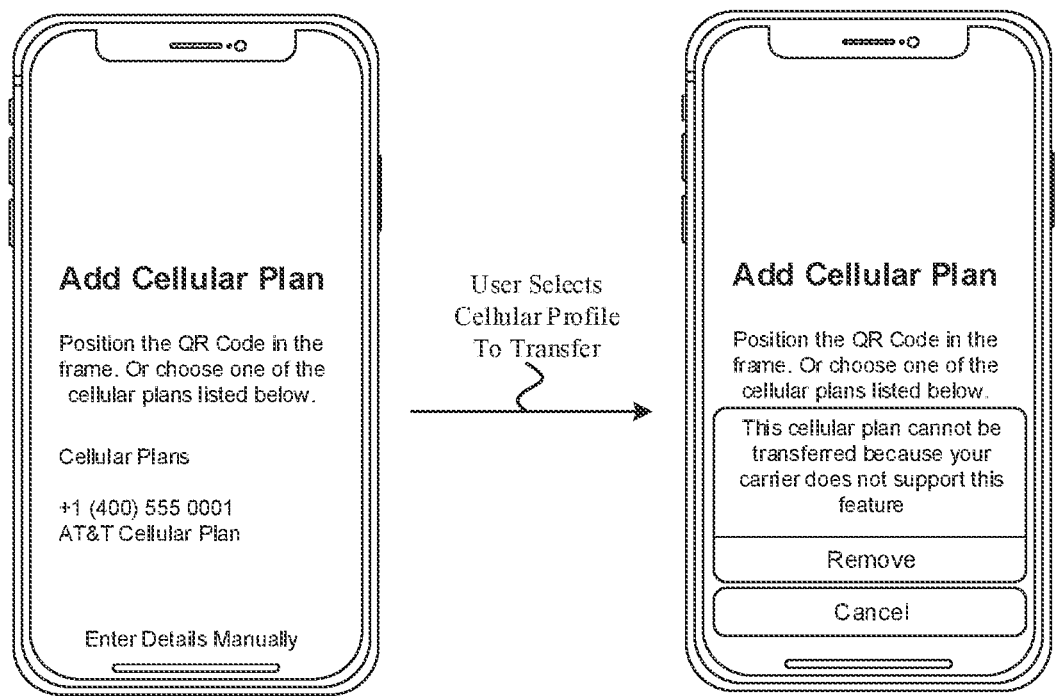
FIG. 5E illustrates a diagram of an example of a user-triggered addition of a cellular service profile to a blacklist, according to some embodiments.

In some embodiments, a user of a mobile wireless device 102 can trigger addition of an entry to the blacklist 520 based on information presented during a cellular service profile transfer, e.g., as illustrated by diagram 550 of FIG. 5E. Some cellular service profiles can be ineligible for transfer between mobile wireless devices 102, such as i) when an MNO 114 does not support a transfer feature, ii) when a cellular service account associated with the cellular service profile is restricted from transfer, or iii) when a cellular service profile is incompatible with an activation lock policy of a mobile wireless device 102. During an attempt to transfer a cellular service profile to the mobile wireless device 102, when an ineligible cellular service profile is selected for transfer, a notification can be provided to the user, e.g., via a display of the mobile wireless device 102, the notification indicating that the cellular service profile is ineligible for transfer to the mobile wireless device 102 and including an option to remove the cellular service plan from the list of transferable cellular service plans. Based on user selection, the cellular service plan can then be added to the blacklist 520.

Figure 5F:
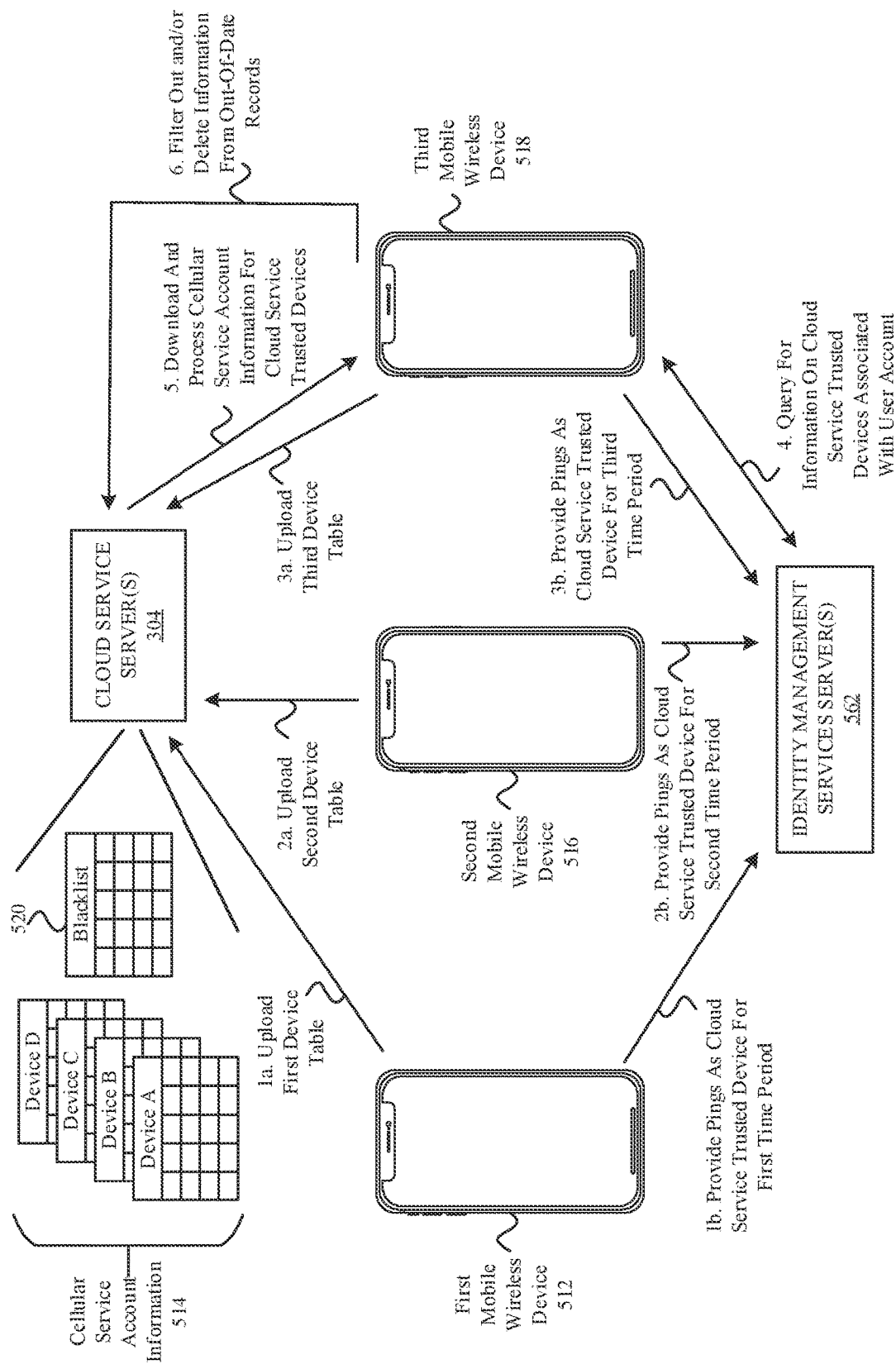
FIG. 5F illustrates a diagram of an example of cellular service account information updating, according to some embodiments.

FIG. 5F illustrates a diagram 560 of an example of updating cellular service account information 514 maintained at cloud-based network servers 304. A mobile wireless device 102 associated with a cloud service account, e.g., an iCloud® account, can periodically send ping signals to an identity management services server 562, thereby providing an indication that the mobile wireless device 102 is functional, signed into the cloud service account, and in active use. Mobile wireless devices 102 that have not provided ping signals to the identity management services server 562 for longer than a pre-determined ping time threshold, e.g., for more than three months, can be considered to be inactive. Cellular wireless service profile information associated with an inactive mobile wireless device 102 can be excluded when generating lists of cellular wireless service profiles eligible to transfer to another mobile wireless device 102 associated with the same cloud service account. As illustrated in FIG. 5F, a first mobile wireless device 512 can sign into a cloud-based service account and upload an encrypted version of a device cellular service profile table 322 for the first mobile wireless device 512 to the cloud-based network servers 304. The first mobile wireless device 512 can provide signaling pings during a first time period, the signaling pings indicating that the first mobile wireless device 512 is signed into the cloud-based service account and in active use. Subsequently, a user can switch from using the first mobile wireless device 512 to using a second mobile wireless device 516. For example, the user can transfer one or more cellular wireless service account profiles from the first mobile wireless device 512 to the second mobile wireless device 516. The second mobile wireless device 516 can sign into the cloud-based service account and upload an encrypted version of a device cellular service profile table 322 for the second mobile wireless device 516 to the cloud-based network servers 304. The second mobile wireless device 516 can provide signaling pings during a second time period, the signaling pings indicating that the second mobile wireless device 516 is signed into the cloud-based service account and in active use. In some embodiments, the second time period does not substantially overlap with the first time period, e.g., the user upgrades to a new mobile wireless device 102. In some embodiments, the first and second time periods overlap, such as when a user adds a mobile wireless device 102 to a common cloud-based service user account. Subsequently, the user can switch from using the second mobile wireless device 516 to using a third mobile wireless device 518. The third mobile wireless device 518 can sign into the cloud-based service account and upload an encrypted version of a device cellular service profile table 322 for the third mobile wireless device 518 to the cloud-based network servers 304. The third mobile wireless device 518 can provide signaling pings during a third time period, the signaling pings indicating that the third mobile wireless device 518 is signed into the cloud-based service account and in active use. In some embodiments, the third time period can be distinct from (not substantially overlap) the first and second time periods, while in other embodiments, the first, second, and/or third time periods can overlap. The third mobile wireless device 518 can query the identity management services servers 562 for information regarding a set of cloud-based service trusted devices, e.g., a list of mobile wireless devices 102 associated with the cloud-based service account. In some embodiments, the third mobile wireless device 518 queries identity management services servers 562 for information on all trusted mobile wireless devices 102 signed into the cloud-based service account. The third mobile wireless device 518 can use the information to determine a last update time/date for each of the trusted mobile wireless devices 102 that have signed into the cloud-based service account and provided signaling pings to the identify management services servers 562. The mobile wireless devices 102 can be identified by unique identifier values, such as their IMEI values. The third mobile wireless device 518 can download and process cellular service account information 514 for all of the cloud-based service account trusted mobile wireless devices 102. The third mobile wireless device 518 can filter out and/or delete information from those trusted mobile wireless devices 102 with a most recent update time/date that is older than a pre-determined ping time threshold, e.g., more than three months elapsed since a most recent signaling ping received by the identity management services servers 562. In some embodiments, the third mobile wireless device 518 excludes cellular service account information 514 from a mobile wireless device 102, e.g., from the first mobile wireless device 512, when presenting a list of cellular wireless service profiles available for transfer to the third mobile wireless device 518. In some embodiments, the third mobile wireless device 518 flags cellular wireless service profiles from a mobile wireless device as potentially out-of-date when presenting a list of cellular service wireless profiles available for transfer to the third mobile wireless device 518, e.g., by providing an indication or warning when presenting the list. In some embodiments, the third mobile wireless device 518 causes a cellular wireless service profile and mobile wireless device 102 combination to be added to the blacklist 520 based on the processing of the cellular service account information with the information obtained from the identity management services servers 562. For example, cellular wireless service profile and device combinations for an inactive mobile wireless device 102 (based on no signaling pings to the identity management services servers 562 for a recent time period that satisfies a pint time threshold) can be added to a blacklist 520. In some embodiments, the third mobile wireless device 518 causes cellular service account information 514, e.g., an cellular service profile table 322 for a mobile wireless device 102, e.g., for the first mobile wireless device 512, to be updated on or removed from cloud-based network servers 304 based on the processing of the cellular service account information with the information obtained from the identity management services servers 562. Out-of-date cellular service account information for inactive mobile wireless devices 102 can be filtered out and/or purged from the cellular service account information 514 based on review of the information obtained from the identity management services servers 562 in combination with information obtained from the cloud-based network servers 304. Filtering, updating, and/or purging of information can occur without user intervention.

Figure 6:
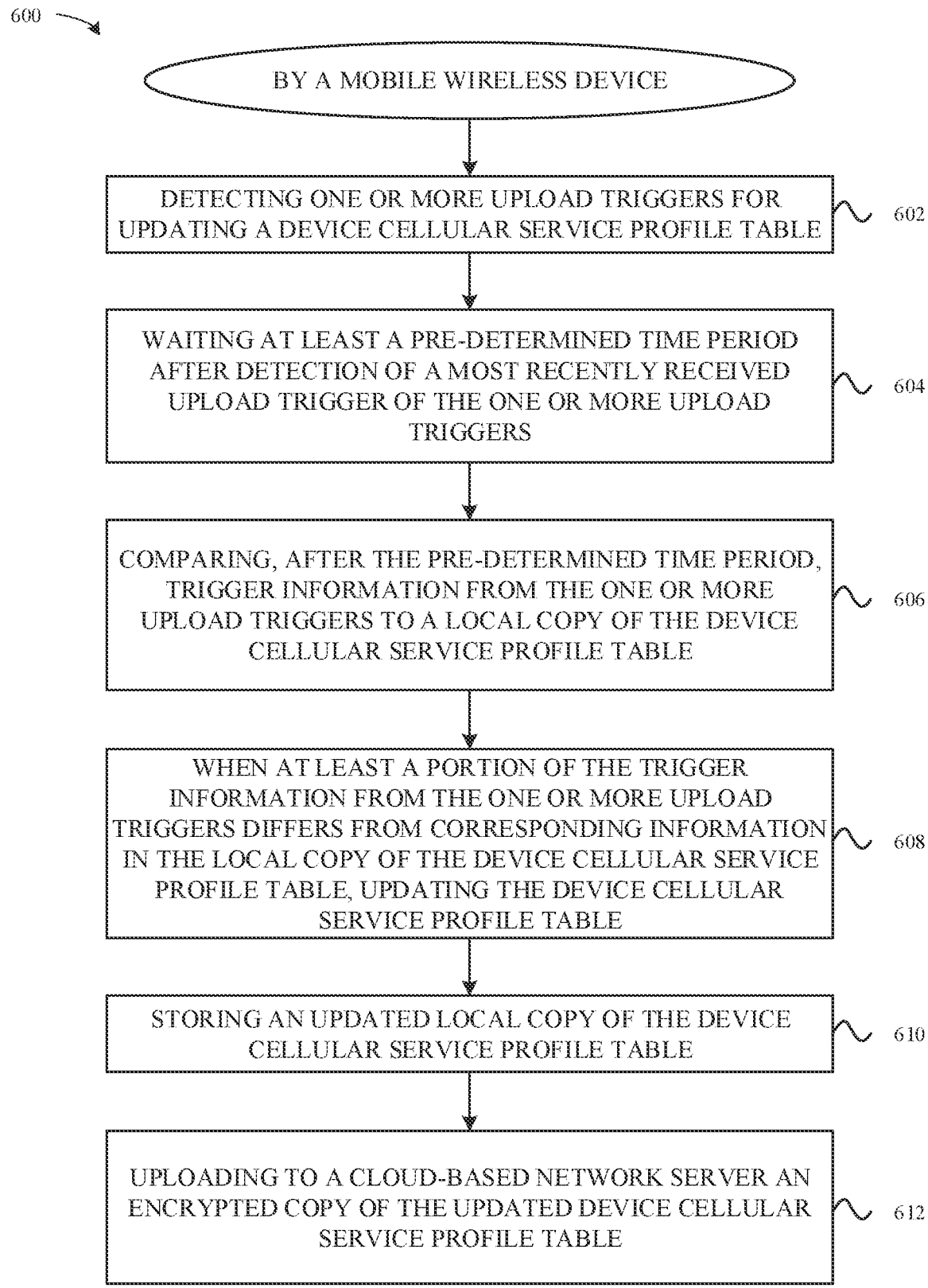
FIG. 6 illustrates a flowchart of an exemplary method performed by a mobile wireless device to update a device cellular service profile table for the mobile wireless device, according to some embodiments.

FIG. 6 illustrates a flowchart 600 of an exemplary method performed by a mobile wireless device 102 to update a device cellular service profile table 322 for the mobile wireless device 102. At 602, the mobile wireless device 102 detects one or more upload triggers for updating a device cellular service profile table 322. At 604, the mobile wireless device 102 waits at least a pre-determined time period after detection of a most recently received upload trigger of the one or more upload triggers. At 606, the mobile wireless device 102 compares, after the pre-determined time period, trigger information from the one or more upload triggers to a local copy of the device cellular service profile table 322. At 608, when at least a portion of the trigger information from the one or more upload triggers differs from corresponding information included in the local copy of the device cellular service profile table 322, the mobile wireless device 102 updates the device cellular service profile table 322. At 610, the mobile wireless device 102 stores an updated local copy of the device cellular service profile table 322. At 612, the mobile wireless device 102 uploads to a cloud-based network server 304 an encrypted copy of the updated device cellular service profile table 322. The device cellular service profile table 322 can include: i) device information characterizing the mobile wireless device 102, and ii) cellular service profile information characterizing one or more SIMs (UICCs 118) and/or eSIMs 208 included in the mobile wireless device 102.

In some embodiments, the information includes a universally unique identifier (UUID) generated by the mobile wireless device 102. In some embodiments, the UUID is used as a label for the encrypted copy of the updated device cellular service profile table 322 stored at the cloud-based network server 304 to safeguard user privacy of the device cellular service profile table 322. In some embodiments, the device information includes an eUICC 108 identifier (EID) on which the eSIMs 208 are stored in the mobile wireless device 102. In some embodiments, the device information includes one or more IMEIs associated with the mobile wireless device 102 by one or more MNOs 114. In some embodiments, the cellular service profile information includes one or more ICCIDs associated with the one or more SIMs (UICCs 118) and/or eSIMs 208 included in the mobile wireless device 102. In some embodiments, the cellular service profile information includes, for each eSIM 208, an indication of whether transfer of the corresponding eSIM 208 to another mobile wireless device 102 is supported. In some embodiments, the cellular service profile information includes a reason for lack of support for transfer of the corresponding eSIM 208, when transfer is not supported. In some embodiments, the cellular service profile information includes an indication of a transfer method type, when transfer is supported.

Figure 7:
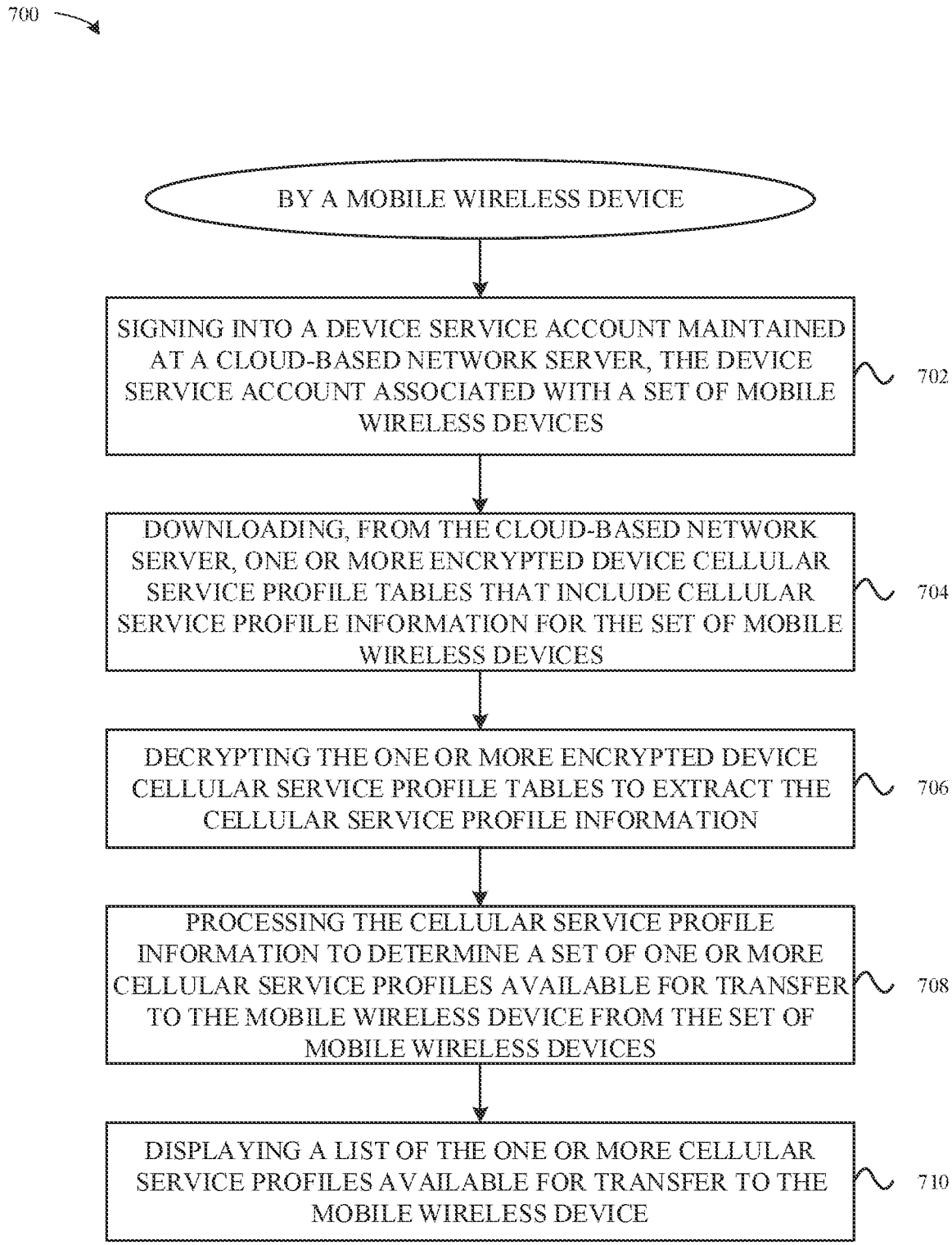
FIG. 7 illustrates a flowchart of an exemplary method performed by a mobile wireless device to display a list of cellular service profiles available to transfer to the mobile wireless device from a set of associated mobile wireless devices, according to some embodiments.

FIG. 7 illustrates a flowchart 700 of an exemplary method performed by a mobile wireless device 102 to display a list of cellular service profiles available to transfer to the mobile wireless device 102 from a set of associated mobile wireless devices 102. At 702, the mobile wireless device 102 signs into a device service account maintained at a cloud-based network server 304, the device service account associated with a set of mobile wireless devices 102. At 704, the mobile wireless device 102, downloads, from the cloud-based network server 304, one or more encrypted device cellular service profile tables 322 that include cellular service profile information for the set of mobile wireless devices 102. At 706, the mobile wireless device 102 decrypts the one or more encrypted device cellular service profile tables 322 to extract the cellular service profile information. At 708, the mobile wireless device 102 processes the cellular service profile information to determine a set of one or more cellular service profiles available for transfer to the mobile wireless device 102 from the set of mobile wireless devices 102. At 710, the mobile wireless device 102 displays a list of the one or more cellular service profiles available for transfer to the mobile wireless device 102.

In some embodiments, the list of the one or more cellular service profiles available for transfer includes phone numbers associated with each cellular service profile displayed in the list. In some embodiments, the mobile wireless device 102 downloads, from the cloud-based network server 304, a blacklist 520 of entries indicating inactive cellular service profiles that are unavailable for transfer to the mobile wireless device 102. In some embodiments, the mobile wireless device 102 processes the cellular service profile information by at least excluding the inactive cellular service profiles from the list of one or more cellular service profiles available for transfer to the mobile wireless device 102. In some embodiments, the blacklist 520 includes, for each entry: i) an integrated circuit card identifier (ICCID) for the inactive cellular service profile, ii) ii) one or more first hardware identifiers for a source mobile wireless device 102 from which the inactive cellular service profile was previously transferred; and iii) one or more second hardware identifiers for a target mobile wireless device 102 that uploaded, to the cloud-based network server 304, information for the entry in the blacklist 520. In some embodiments, the one or more first hardware identifiers for the source mobile wireless device 102 include: i) an EID of the source mobile wireless device 102 when the inactive cellular service profile includes an eSIM 208, and ii) an IMEI of the source mobile wireless device 102 when the inactive cellular service profile includes a physical SIM card (UICC 118). In some embodiments, the mobile wireless device 102 transfers, to the mobile wireless device 102, at least one cellular service profile from the list of one or more cellular service profiles available for transfer, updates a device cellular service profile table 322 for the mobile wireless device 102 based on transfer of the at least one cellular service profile to the mobile wireless device 102, and uploads to the cloud-based network server 304, an encrypted copy of the updated device cellular service profile table. In some embodiments, the mobile wireless device 102 uploads information for adding an entry to a blacklist 520 of inactive cellular service profiles for the set of mobile wireless devices 102. In some embodiments, the added entry includes: i) at least one ICCID for the at least one cellular service profile transferred to the mobile wireless device 102, ii) one or more first hardware identifiers for the mobile wireless device 102 to which the at least one cellular service profile transferred, and iii) one or more second hardware identifiers for a second mobile wireless device 102 from which the at least one cellular service profile was transferred.

Figure 8:
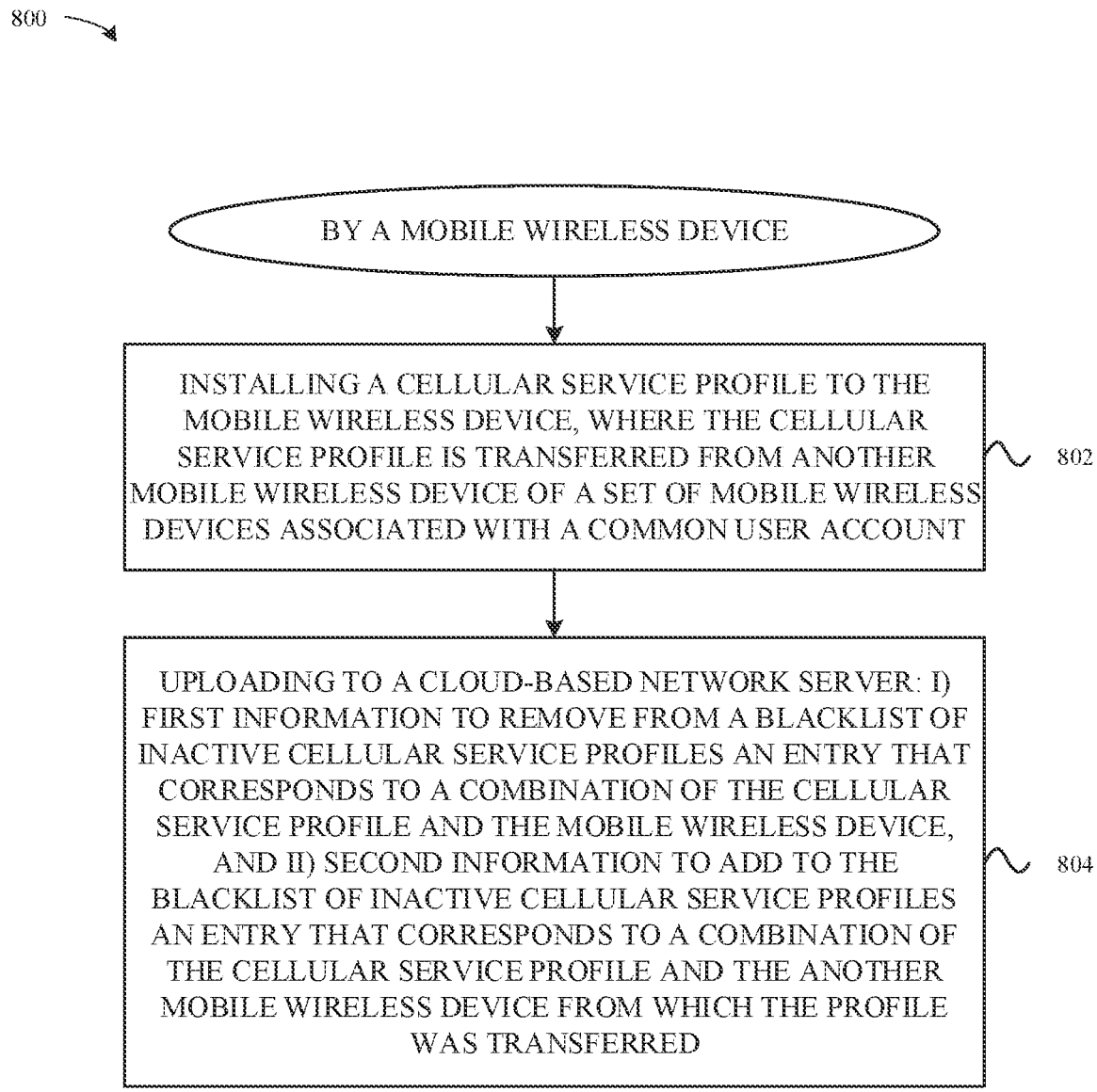
FIG. 8 illustrates a flowchart of an exemplary method performed by a mobile wireless device to update a blacklist of inactive cellular service profiles based on installation of a cellular service profile on the mobile wireless device, according to some embodiments.

FIG. 8 illustrates a flowchart 800 of an exemplary method performed by a mobile wireless device 102 to update a blacklist 520 of inactive cellular service profiles based on installation of a cellular service profile on the mobile wireless device 102. At 802, the mobile wireless device 102 installs a cellular service profile to the mobile wireless device 102, where the cellular service profile is transferred from another mobile wireless device 102 of the set of mobile wireless devices 102. At 804, the mobile wireless device 102 uploads to a cloud-based network server 304: i) first information to remove from the blacklist 520 of inactive cellular service profiles an entry that corresponds to a combination of the cellular service profile and the mobile wireless device 102, and ii) second information to add to the blacklist 520 of inactive cellular service profiles an entry that corresponds to a combination of the cellular service profile and the another mobile wireless device 102 from which the cellular service profile was transferred.

In some embodiments, the method further includes the mobile wireless device 102: i) downloading, from the cloud-based network server 304, encrypted copies of device cellular service profile tables 322 for the set of mobile wireless devices 102; ii) decrypting the encrypted copies of the device cellular service profile tables 322 to extract cellular service profile information included therein; iii) comparing a phone number of the cellular service profile installed to the mobile wireless device 102 to phone numbers in the cellular service profile information extracted from the device cellular service profile tables 322; and determining the second information to add the entry to the blacklist 520 based on the phone number of the cellular service profile matching cellular service profile information for the another mobile wireless device 102.

Figure 9:
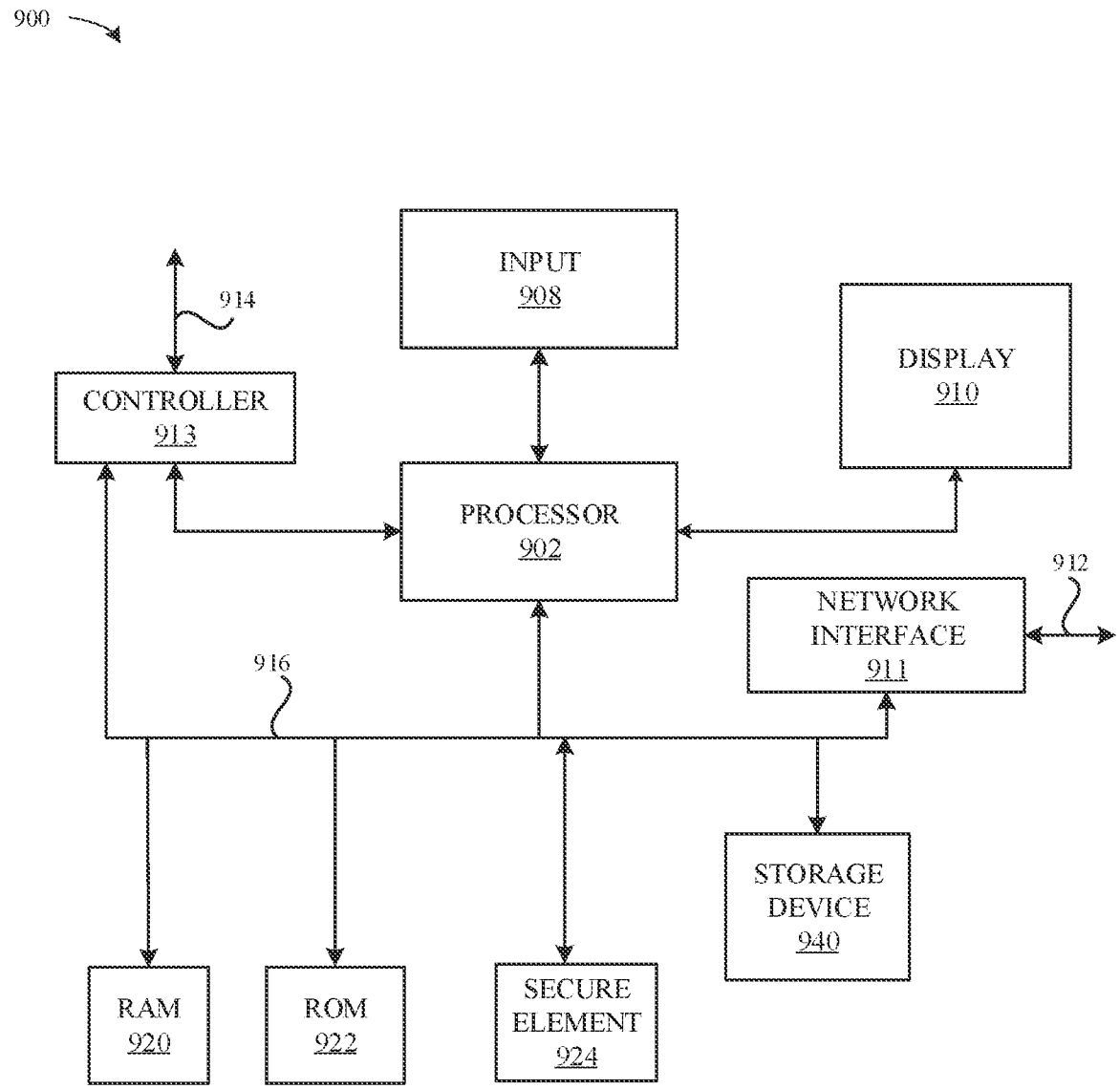
FIG. 9 illustrates a block diagram of exemplary elements of a mobile wireless device, according to some embodiments.

FIG. 9 illustrates a detailed view of a representative computing device 900 that can be used to implement various methods described herein, according to some embodiments. In particular, the detailed view illustrates various components that can be included in the mobile wireless device 102, any of the mobile wireless devices 102A, 102B, 102C, 102D, a source device 342, a target device 346, and/or any of first, second, third mobile wireless devices 512, 516, 518 as discussed herein. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 that can be controlled by the processor 902 to display information to the user. A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that communicatively couples to a data link 912. In the case of a wireless connection, the network/bus interface 911 can include a wireless transceiver.

The computing device 900 also includes a storage device 940, which can comprise a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900. The computing device 900 can further include a secure element (SE) 924, which can represent secure storage for credentials for cellular wireless system access by the computing device 900. The secure element 924 can include an eUICC 108 on which to store one or more eSIMs 208 and/or a UICC 118 that stores SIM or eSIM credentials.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A mobile wireless device configured for cellular service profile management, the mobile wireless device comprising:
 wireless circuitry comprising one or more antennas; and
 one or more processors communicatively coupled to the wireless circuitry and to a memory storing instructions that, when executed by the one or more processors, cause the mobile wireless device to:
install, at the mobile wireless device, a cellular service profile transferred from a second mobile wireless device;
upload, to a cloud service server, first information to remove an entry corresponding to a combination of the mobile wireless device and the cellular service profile from a blacklist of inactive cellular service profiles; and
upload, to the cloud service server, second information to add an entry corresponding to a combination of the second mobile wireless device and the cellular service profile to the blacklist.

2. The mobile wireless device of claim 1, wherein the first information comprises an updated cellular service profile table for the mobile wireless device that includes information for the cellular service profile transferred from the second mobile wireless device.

3. The mobile wireless device of claim 1, wherein the mobile wireless device is further configured to:
receive, from a mobile network operator (MNO) associated with the cellular service profile, a quick response (QR) code associated with transfer of the cellular service profile; and
scan the QR code as part of transfer of the cellular service profile.

4. The mobile wireless device of claim 1, wherein the mobile wireless device is further configured to:
download, from an original equipment manufacturer (OEM) managed, network accessible server, profile information for the cellular service profile,
wherein the second mobile wireless device previously uploaded the profile information to the OEM managed, network accessible server.

5. The mobile wireless device of claim 1, wherein the cellular service profile is transferred to the mobile wireless device by moving a physical subscriber identity module (SIM) card from the second mobile wireless device to the mobile wireless device.

6. The mobile wireless device of claim 1, wherein the mobile wireless device is further configured to:
download, from the cloud service server, a device cellular service profile table for the second mobile wireless device; and
locate, in the device cellular service profile table for the second mobile wireless device a profile entry for the cellular service profile transferred from the second mobile wireless device to the mobile wireless device, wherein the mobile wireless device uploads the second information responsive to locating the profile entry.

7. The mobile wireless device of claim 6, wherein:
the cellular service profile comprises an electronic subscriber identity module (eSIM); and
the mobile wireless device locates the profile entry based at least on finding a phone number match of the cellular service profile on the mobile wireless device to an inactivated cellular service profile on the second mobile wireless device in the device cellular service profile table for the second mobile wireless device.

8. The mobile wireless device of claim 1, wherein the mobile wireless device and the second mobile wireless device are associated with a common user account.

9. The mobile wireless device of claim 1, wherein the mobile wireless device is further configured to:
activate the cellular service profile on the mobile wireless device based on interaction with a mobile network operator (MNO) infrastructure server of an MNO associated with the cellular service profile.

10. The mobile wireless device of claim 1, wherein the mobile wireless device is further configured to:
transfer the cellular service profile from the mobile wireless device back to the second mobile wireless device; and
inactivate the cellular service profile on the mobile wireless device based on interaction with a mobile network operator (MNO) infrastructure server of an MNO associated with the cellular service profile.

11. The mobile wireless device of claim 1, wherein the mobile wireless device is further configured to:
prior to transfer of the cellular service profile to the mobile wireless device:
download, from the cloud service server, cellular service profile information for a set of mobile wireless devices to which the mobile wireless device belongs and associated with a common device service account at the cloud service server;
process the cellular service profile information to determine a list of one or more cellular service profiles available for transfer to the mobile wireless device; and
present the list of one or more cellular service profiles via a display of the mobile wireless device for selection of cellular service profiles for transfer to the mobile wireless device.

12. The mobile wireless device of claim 11, wherein the mobile wireless device is further configured to:
prior to transfer of the cellular service profile to the mobile wireless device:
download, from the cloud service server, a blacklist table indicating inactive cellular service profiles unavailable for transfer to the mobile wireless device,
wherein the list of one or more cellular service profiles presented for selection of cellular service profiles for transfer excludes the inactive cellular service profiles.

13. A method for cellular service profile management, the method comprising:
by a mobile wireless device:
installing, at the mobile wireless device, a cellular service profile transferred from a second mobile wireless device;
uploading, to a cloud service server, first information to remove an entry corresponding to a combination of the mobile wireless device and the cellular service profile from a blacklist of inactive cellular service profiles; and
uploading, to the cloud service server, second information to add an entry corresponding to a combination of the second mobile wireless device and the cellular service profile to the blacklist.

14. The method of claim 13, further comprising:
by the mobile wireless device:
receiving, from a mobile network operator (MNO) associated with the cellular service profile, a quick response (QR) code associated with transfer of the cellular service profile; and
scanning the QR code as part of transfer of the cellular service profile.

15. The method of claim 13, further comprising:
by the mobile wireless device:
- downloading, from an original equipment manufacturer (OEM) managed, network accessible server, profile information for the cellular service profile,
- wherein the second mobile wireless device previously uploaded the profile information to the OEM managed, network accessible server.

16. The method of claim 13, wherein the installing the cellular service profile from the second mobile wireless device to the mobile wireless device comprises moving a physical subscriber identity module (SIM) card from the second mobile wireless device to the mobile wireless device.

17. The method of claim 13, further comprising:
by the mobile wireless device:
- downloading, from the cloud service server, a device cellular service profile table for the second mobile wireless device; and
- locating, in the device cellular service profile table for the second mobile wireless device a profile entry for the cellular service profile transferred from the second mobile wireless device to the mobile wireless device,
- wherein the mobile wireless device uploads the second information responsive to locating the profile entry.

18. The method of claim 17, wherein:
the cellular service profile comprises an electronic subscriber identity module (eSIM); and
the mobile wireless device locates the profile entry based at least on finding a phone number match of the cellular service profile on the mobile wireless device to an inactivated cellular service profile on the second mobile wireless device in the device cellular service profile table for the second mobile wireless device.

19. A non-transitory computer-readable storage medium storing instructions that, when executed by one or more processors of a mobile wireless device, configure the mobile wireless device to:
- install, at the mobile wireless device, a cellular service profile transferred from a second mobile wireless device;
- upload, to a cloud service server, first information to remove an entry corresponding to a combination of the mobile wireless device and the cellular service profile from a blacklist of inactive cellular service profiles; and
- upload, to the cloud service server, second information to add an entry corresponding to a combination of the second mobile wireless device and the cellular service profile to the blacklist.

20. The non-transitory computer-readable storage medium of claim 19, wherein the mobile wireless device is further configured to:
- download, from the cloud service server, a device cellular service profile table for the second mobile wireless device; and
- locate, in a device cellular service profile table for the second mobile wireless device a profile entry for the cellular service profile transferred from the second mobile wireless device to the mobile wireless device,
- wherein the mobile wireless device uploads the second information responsive to locating the profile entry.

* * * * *